United States Patent [19]

Schneider et al.

[11] Patent Number: 4,961,149

[45] Date of Patent: Oct. 2, 1990

[54] METHOD AND APPARATUS FOR MARKING AND CUTTING A FLEXIBLE WEB

[75] Inventors: Bruce H. Schneider, Fort Calhoun; Jerry S. Schneider, Omaha, both of Nebr.; Mark E. Smith, Council Bluffs, Iowa

[73] Assignee: Intellitek, Inc., Counsel Bluffs, Iowa

[21] Appl. No.: 303,470

[22] Filed: Jan. 27, 1989

[51] Int. Cl.[5] .............................................. G06F 15/46

[52] U.S. Cl. ...................................... 364/469; 83/175; 83/76.4; 358/107; 364/470; 364/474.09

[58] Field of Search .............. 364/470, 474.09, 474.13, 364/469; 358/101, 107; 356/429, 430, 431; 250/548, 559, 571; 382/8; 83/941, 71–76, 175–177, 936, 76.1–76.9

[56] References Cited

U.S. PATENT DOCUMENTS

| | | | |
|---|---|---|---|
| 819,431 | 3/1901 | Hurd | 83/175 |
| 2,840,721 | 6/1958 | Frommer | 83/74 |
| 3,229,175 | 1/1966 | Strandberg | 364/470 |
| 3,498,165 | 3/1970 | Austin | 83/175 |
| 3,610,081 | 10/1971 | Gerber | 83/62 |
| 3,625,099 | 4/1970 | Mase et al. | 83/941 |
| 3,761,675 | 9/1973 | Mason et al. | 364/474.09 |
| 4,034,634 | 7/1977 | Arbter | 83/175 |
| 4,648,540 | 3/1987 | Steidel | 364/469 X |
| 4,719,575 | 1/1988 | Gnuechtel | 364/469 |
| 4,725,961 | 2/1988 | Pearl | 364/474.13 |
| 4,758,960 | 7/1988 | Jung | 364/474.13 |

*Primary Examiner*—Joseph Ruggiero
*Attorney, Agent, or Firm*—Welsh & Katz, Ltd.

[57] ABSTRACT

The present invention relates to a method and apparatus for marking and cutting a flexible web that can be supplied from a supply roll of material onto a generally flat working surface or bed to a take-up roll. While the present invention is particularly adapted for marking and cutting fabric, such as may be used to manufacture upholstered furniture, such as couches, love seats, chairs and the like, the invention may also be used to mark and cut almost any flexible web, and particularly any web that is susceptible of experiencing dimensional distortion, such as bowing, skewing or stretching in unusual directions. The apparatus utilizes computer control and video imaging to identify design features and to locate them relative to pieces so that the item of furniture has design features at the desired locations.

24 Claims, 15 Drawing Sheets

METHOD AND APPARATUS FOR MARKING AND CUTTING A FLEXIBLE WEB

The present invention generally relates to a method and apparatus for marking and cutting a flexible web, and more particularly relates to the marking and cutting of a fabric that may be used in the manufacture of upholstered furniture or the like.

It is well known that furniture makers must cut individual pieces of fabric for covering the frame, cushions and other necessary components of an upholstered item of furniture. The craftsmen or artisans that do this work must be mindful not only of the shape and size of the pieces that must be cut, but also of the design and orientation of the fabric, so that when the pieces are sewn together, the item of furniture will have the desired appearance. The ability to perform the layout of the pieces from a web of fabric before cutting to obtain the desired result without wasting fabric varies with the skill of the craftsman. Obviously, this skill is acquired through training and experience, and is not easily learned.

It is also known that different fabrics have different characteristics in terms of the amount of stretch the fabrics exhibit, the amount of dimensional distortion the fabrics can have in terms of directional stretching, and the like. If the fabric can be more easily stretched in one direction than the other, there is a tendency for the resulting item of furniture to experience some visual distortion, particularly if the artisan was not sufficiently skilled to compensate for the characteristics of the fabric during the cutting and sewing process.

Another significant factor in the manufacture of certain upholstered pieces of furniture, such as chairs, sofas, love seats and the like, is a result of the fact that a substantial amount of such pieces of furniture are made using a fabric that has a predominate design feature, such as flowers, stripes, or the like. When pieces of furniture are made from fabrics having a flower design in them, it is common practice for the flower to be centered in the cushions and other prominent locations in the resulting piece. It is therefore necessary that the pieces of fabric be laid out so that the flower will be properly located when the fabric pieces are sewn together. This factor also contributes to the difficulty of producing a superior product, and is one that the skilled artisan must be able to consider and compensate for in the course of marking the cutting the pieces of fabric preparatory to sewing the fabric pieces together in making the furniture.

It should be apparent that training such artisans requires much time and expense, and that a manufacturer must maintain an adequate work force in order to meet its production requirements. It should also be apparent that even with skilled artisans doing the marking and cutting of the fabric, this phase of the production is time consuming and expensive. Also, while the artisans may be skilled in performing their duties, the efficiency of individual artisans may vary dramatically relative to one another, both in terms of their speed of marking and cutting, and also in terms of the amount of waste material that each produces. The fabrics that are used in many upholstered pieces of furniture is often very expensive, and the waste of fabric can have a major impact on the profitability of the manufacturer.

With the above factors and considerations in mind, it is an object of the present invention to provide a method and apparatus for marking and cutting fabrics for use in making upholstered furniture, whereby the marking and cutting is not dependent upon the skill of an artisan, and in fact is done automatically.

It is another object of the present invention to provide a method and apparatus for marking and cutting fabric that identifies a predominate design feature that is to appear at certain locations of the item of furniture that the fabric is to cover, and to lay out the pieces in such a way so that the pieces can be easily sewn together to result in the design features appearing at the proper locations.

A more detailed object of the invention is to provide a method and apparatus that automatically scans a fabric, identifies its predominate design feature, such as a flower or the like, and then lays out the uniquely shaped pieces so that when they are cut and ultimately sewn together, the design features are located at the desired places on the piece of the furniture.

Yet another object of the present invention is to provide a method and apparatus that automatically detects any misalignment and/or dimensional distortion that exists in the fabric, and compensates for such misalignment and/or dimensional distortion by adjusting the orientation and shape of the pieces that are marked and cut from a web of fabric.

A more specific object of the invention lies in the provision for compensating for bowing and/or skewing of the fabric when it is laid out on the apparatus, so that the pieces of fabric will not be distorted, which could otherwise result in distortion of the fabric on the piece of completed furniture.

Yet another object of the present invention lies in the provision for compensating for the stretch of the fabric, so that accurate fitting of the fabric over the frame of the item of furniture as well as over the cushions is achieved.

Still another detailed object of the present invention is to provide a system that can be placed in a plant site without the requirement of providing a highly sophisticated lighting environment which would otherwise be necessary for proper operation of the visual scanning and mapping process necessary for laying out and cutting of the fabric. The system automatically provides compensation for light variations over the bed frame, generates a data base that includes light values over the bed frame and generates a compensation factor for those light values, so that accurate and reliable results are achieved.

Another object of the present invention resides in the capability of the preferred embodiment of the apparatus to cut the pieces of the web of fabric with a water jet cutting mechanism so that the pieces are substantially severed from one another, but the web has a sufficient number of uncut threads extending across the cut lines so that the web maintains its integrity. This permits the web to be wound onto the take-up roll for future fabrication of furniture. An ancillary object of the invention resides in the apparatus utilizing an advancing feature that moves the cut fabric toward the take-up roll so that the cut pieces of the web are not pulled apart.

Other objects and advantages will become apparent from the ensuing detailed description, while referring to the attached drawings, in which.

Figure 4A:
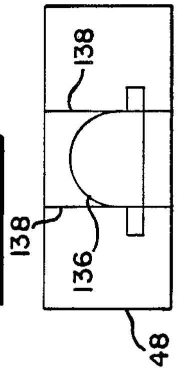
Figure 4B:
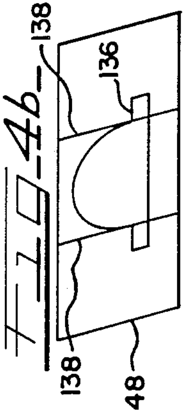
Figure 4C:
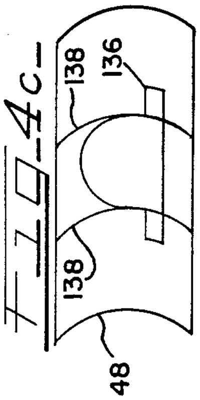
Figure 6A:
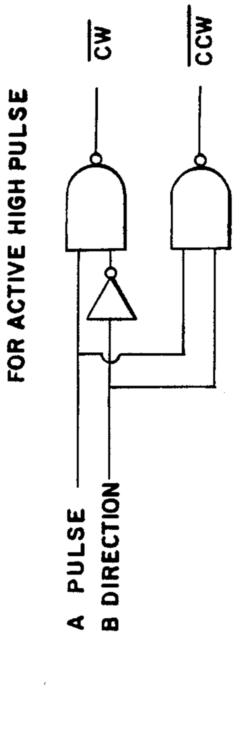
Figure 6B:
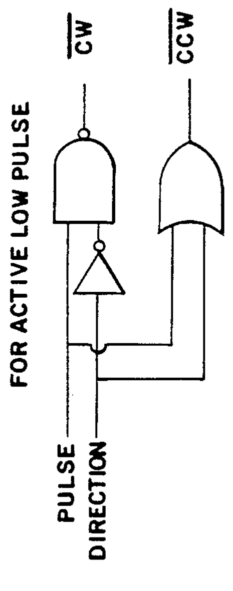
Figure 5:
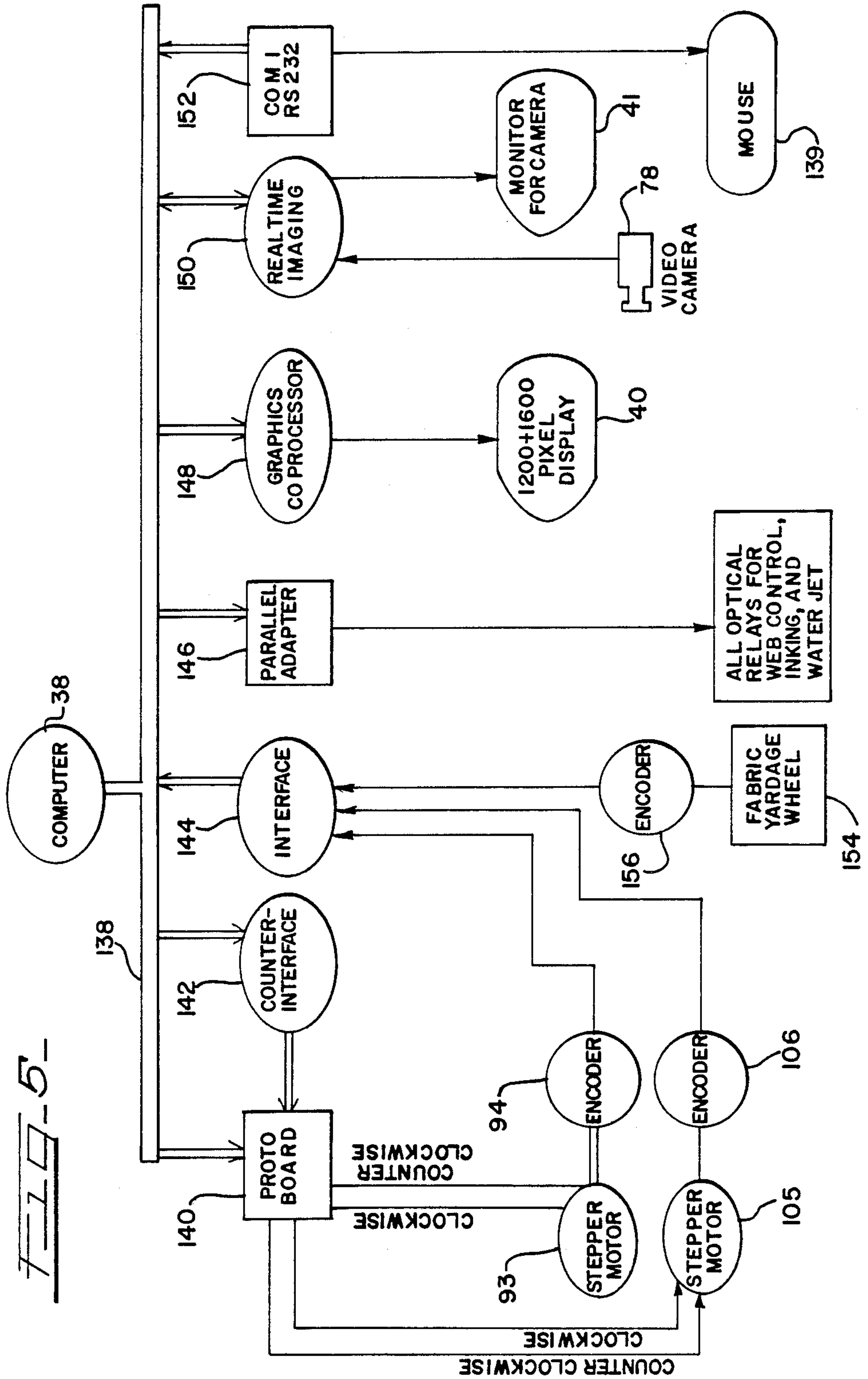

FIGS. 4*a*, 4*b* and 4*c*, respectively illustrate plan views of cushions which exhibit (a) no dimensional distortion in terms of skew or bow, (b) very high skew, and (c) very large bow;

FIG. 5 is a block diagram of the computer control portion of the apparatus of the present invention, shown with interconnection with other components of the apparatus:

FIGS. 6*a* and 6*b* are electrical circuit diagrams of a portion of the computer control portion of the apparatus of the present invention; and, FIGS. 7 through 17 illustrate flow charts which the computer control portion of the apparatus of the present invention carry out during operation.

DETAILED DESCRIPTION

Broadly stated, the present invention relates to a method and apparatus for marking and cutting a flexible web that can be supplied from a supply roll of material onto a generally flat working surface or bed to a take-up roll. While the present invention is particularly adapted for marking and cutting fabric, such as may be used to manufacture upholstered furniture, such as couches, love seats, chairs and the like, the invention may also be used to mark and cut almost any flexible web, and particularly any web that is susceptible of experiencing dimensional distortion, such as bowing, skewing or stretching in unusual directions. Additionally, while many types of flexible webs may be marked and cut, because the invention is particularly suited to marking and cutting fabrics for fabricating upholstered furniture, the following description will be directed to such use.

The apparatus is adapted for automatically marking and cutting pieces of the fabric, and does so utilizing a computing means, such as a large scale digital computer, the particular model and configuration of which will be hereinafter described. The apparatus has a scanning means, such as a video camera and the fabric is scanned and the image is digitized and recorded in a memory associated with the computer. The image is then analyzed and the particular pieces that are needed for a particular item of furniture are then laid out, marked and cut during operation.

Since the camera scans the fabric for the purpose of storing the image of the fabric in memory, the scanning is dependent upon the lighting conditions that are present across the field of the scanning process. While it is desireable that the lighting values be very constant across the field of scanning, so that the various gray levels that are being measured on the pattern of the fabric will be accurately digitized and stored in memory for the same fabric detail or design that may be present at different locations across the field of the fabric, the present apparatus does not require absolute uniformity of light across the field. This is because the apparatus can scan the entire field when a fabric is present which is of uniform color, and a data base of light levels for various coordinates is determined for the entire field. When this has been done, the apparatus can thereafter compensate or adjust for variations in the light levels for different areas of the field when the apparatus is scanning a fabric having decorative patterns in it. This data base can be updated as often as desired or necessary, as lighting conditions can change, even when there is no outside light affecting the light levels of the field being scanned. It is, of course, undesirable for outside ambient light to affect the light levels of the field, as the differences between sunny and cloudy days can have a profound effect on the light levels on the field, and therefore the operation of the apparatus.

In accordance with an important aspect of the present invention, during the scanning of the fabric, the apparatus detects whether the fabric is distorted, and if it is, the apparatus automatically compensates for the dimensional distortion when it lays out the pieces on the fabric, and marks and cuts the same. It is preferred that the fabric be marked and cut in a manner whereby the fabric maintains its integrity.

In the preferred embodiment, the fabric is cut using a water jet cutting mechanism that can be adjusted to cut the fabric in a way such that a minor number of threads remain intact across the cut lines. This results in the fabric sufficiently maintaining its integrity so that the cut pieces do not fall apart, and the fabric can be moved to be wound onto the take-up roll. When the fabric is removed for fabricating an item of furniture, the pieces can be simply pulled apart by the artisans and can thereafter be sewn together. Alternatively, the cuts can be made by a conventional cutter head or the like, which cut the fabric completely where it is operated. In this type of cutting, small uncut portions should be left, rather than the pieces being entirely cut, so that the integrity of the web of fabric is maintained. Those areas where the cuts are not completed are then marked so that the artisans know where to complete the cut to obtain the individual pieces needed to make the item of furniture.

After the pieces are marked and cut as the fabric is drawn from the supply roll, the fabric can be transported to the area where the pieces can be sewn together to make the furniture pieces.

Figure 1:
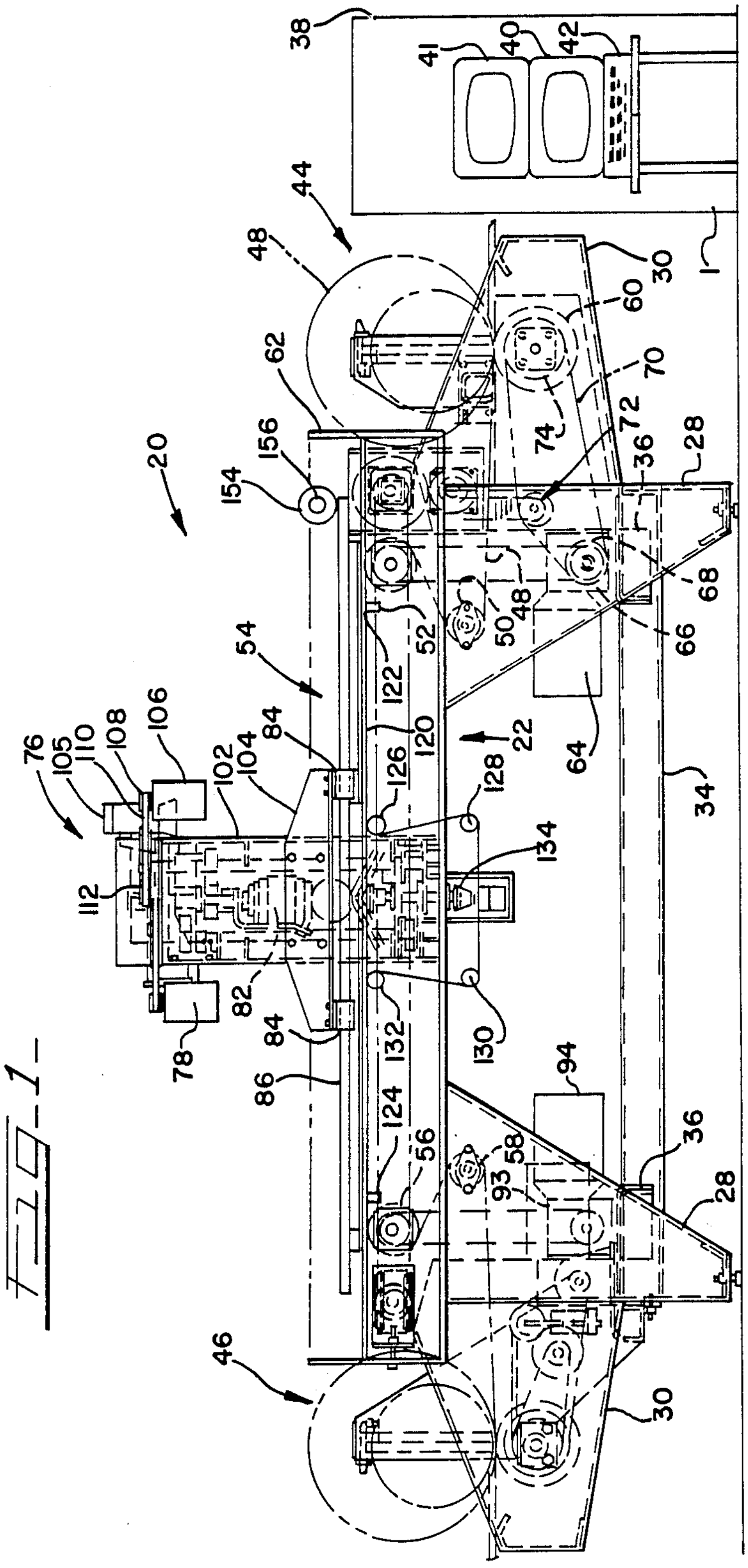
FIG. 1 is a side elevation of a preferred embodiment of apparatus of the present invention, and which can be used to practice the method of the present invention.
Figure 2:
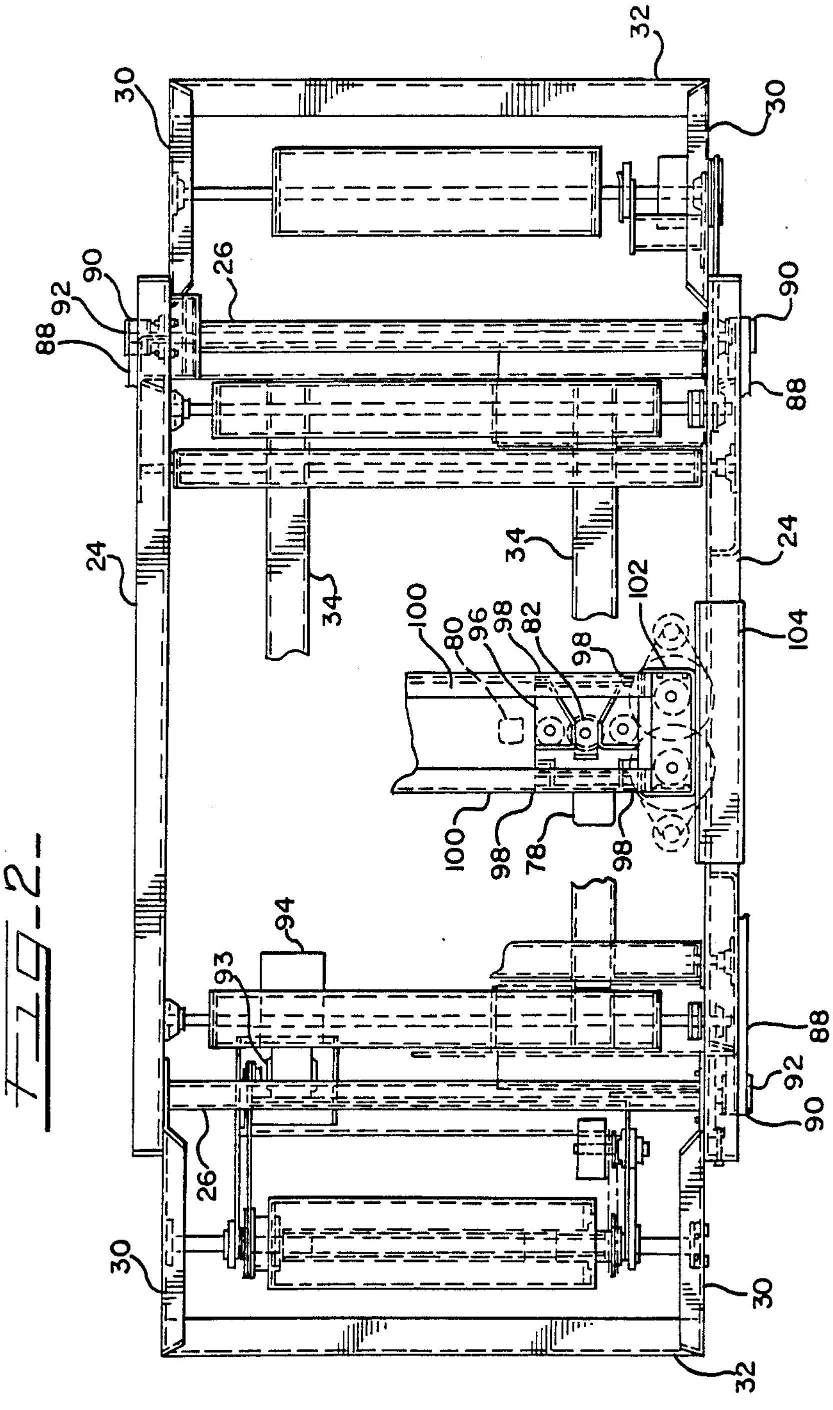
FIG. 2 is top plan view of the apparatus illustrated in FIG. 1
Figure 3:
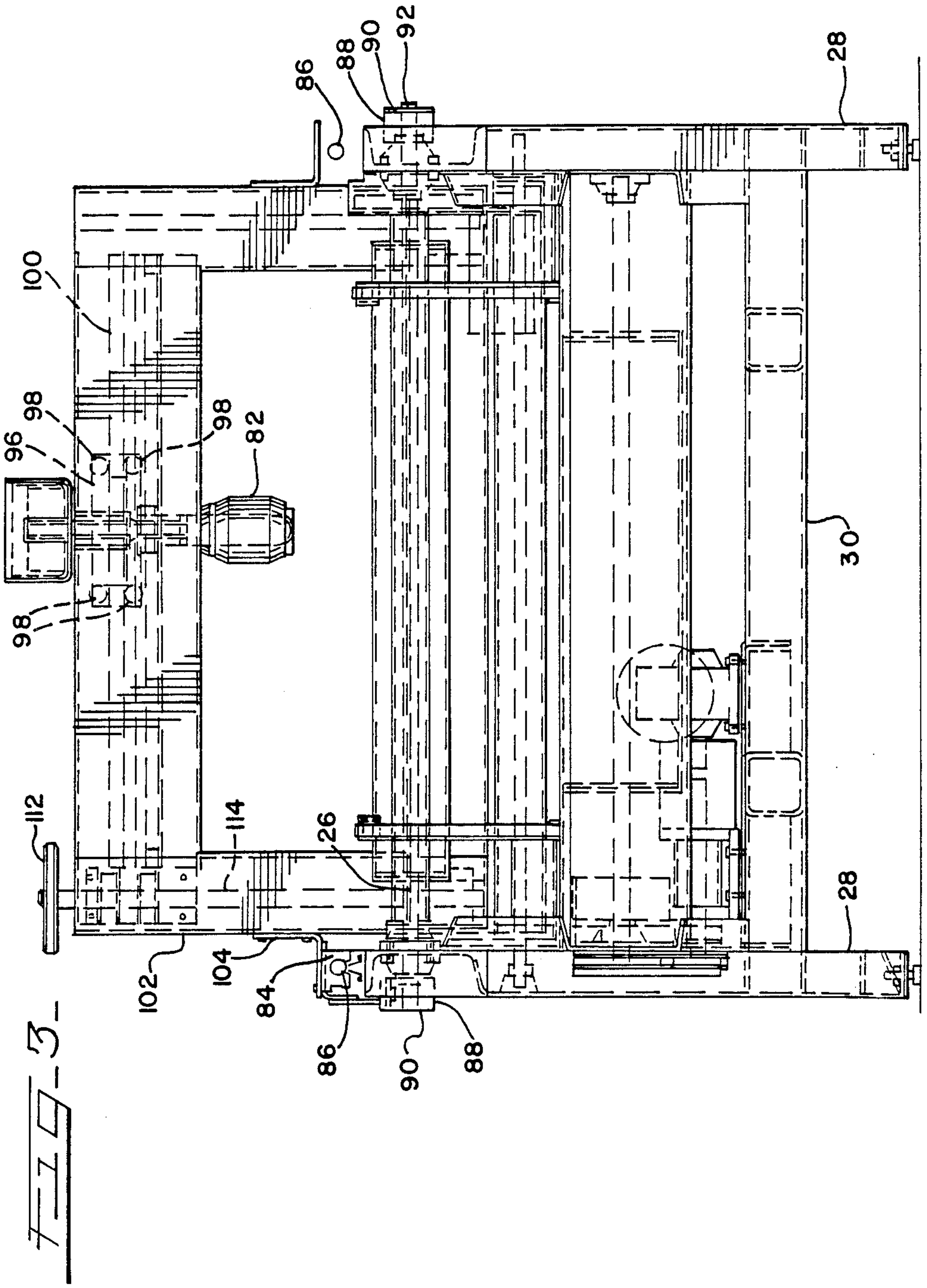
FIG. 3 is an end -elevation of the apparatus illustrated in FIGS. 1 and 2.

Turning now to the drawings, and particularly FIGS. 1, 2 and 3, the apparatus, indicated generally at 20, has a frame structure 22 that includes side rails 24, upper end cross members 26, leg structures 28, side extensions 30 and associated cross supports 32. The frame also has interior longitudinal frame members 34 that are attached to lower cross members. The frame structural elements are of conventional design and are intended to provide a strong framework for the apparatus and provide mounting surfaces for other components of the apparatus as will be hereinafter described.

The apparatus has a computer 38 for controlling the operation of the apparatus, and the computer has an associated monitor 40, another monitor 41 for the camera output, and keyboard 42 for use by an operator. The computer and associated equipment will be described hereinafter in connection with the electrical block diagram of FIG. 5.

The apparatus has a supply roll mechanism 44 and : a take-up roll mechanism 46 on opposite ends thereof, the former of which is adapted to receive a roll of fabric 48 for marking and cutting. As the fabric is unrolled from the mechanism 46, it passes under roller 50 up to roller 52, over the bed of the apparatus, indicated generally at 54, to roller 56, under roller 58 onto the take-up roll mechanism. The take-up roll mechanism operates to receive the marked and cut fabric. It can then be removed from the apparatus, or is can be rewound back onto the supply roll if desired, and providing a cutting operation is used which maintains uncut webs or bridge portions spaced along the cut lines of the pieces. This maintains the web in one piece so that it can be wound onto the take-up roll, and also rewound onto the supply roll if desired. If the water jet cutting mechanism of the preferred embodiment is used, then the fabric cannot be reliably rewound onto the supply roll after cutting, because the pieces may be easily pulled apart before that is desired.

Both the supply roll mechanism 44 and the takeup roll mechanism 46 are controlled by the computer 38, and since they both have similar components, the structure and operation of only the supply roll mechanism will be described. The mechanism has a drive roll 60 located beneath a pivotable support structure 62 that is adapted to hold a roll of fabric which can be of varying size. The support structure can be raised by hydraulic cylinders (not shown) to move the roll of fabric out of contact with the drive roll 60 so that it can be removed from the apparatus or placed on the apparatus. In addition, when the fabric is advanced toward the take-up roll, the hydraulic cylinder is activated to raise the supply roll so that it is out of contact with the drive roll 60. Otherwise, the fabric is not reliably advanced. The drive roll 60 is driven by a motor 64 having an associated gear box 66 and pulley 68 on which a timing belt 70 is reeved. The belt 70 rides over a tensioning idler 72 and is reeved about a driven pulley 74 attached to the drive roll 60. The operation of the motor through the described drive components causes the supply roll to be rotated to either feed out fabric to the bed 54 or to rewind the fabric back onto the fabric roll 48. It also cooperates with the take-up roll drive mechanism to maintain the proper tension on the fabric as it rests on the bed 54.

The apparatus has a carriage mechanism 76 that is movable across the bed 54, and the carriage mechanism carries several important components of the apparatus, including a video camera 78, a marking mechanism 80 and a cutting mechanism 82. The camera is preferably a solid-state imaging device, such as a Model TI-23A CCD camera manufactured by NEC Corporation. The carriage mechanism 78 has a lower portion and an upper portion, with the two portions being generally separated by the plane of the fabric 48 on the bed 54. The upper portion carries the camera 78 and the cutting mechanism 82 and the lower portion carries the marking mechanism 80. The marking mechanism is carried on the lower portion so that it can mark the back side of the fabric as is preferred. Also, when a water jet cutting mechanism (the preferred embodiment) is used, the lower portion of the carriage mechanism carries a water collector immediately below the water jet.

The carriage mechanism is movable in the longitudinal direction of the apparatus by slidable brackets 84 that ride on side rails 86, and the mechanism is moved by timing belts 88 located on opposite sides of the mechanism, which belts are attached to the mechanism and which are carried by pulleys 90 located on opposite ends of the bed. The pulleys 90 are mounted to suitably journaled shafts 92, and a stepper motor 93 and an encoder 94 controlled by the computer 38 is coupled to one of the shafts so that operation of the encoder will cause the carriage mechanism to be moved to the right or left as shown in FIGS. 1 and 2 to properly position the camera, cutting mechanism and/or marking mechanism during operation. The encoder 94 as well as the other encoders to be described are preferably Model BUF105-1230 SLO-SYN stepping motor controls manufactured by the Superior Electric Corporation of Bristol, Connecticut.

A portion of the carriage mechanism is also movable in the transverse direction for the purpose of positioning the camera, cutting mechanism and/or marking mechanism across the width of the fabric 48 during operation. To this end, the carriage mechanism is provided with upper and lower transversely movable subcarriage mechanisms 96 (only the upper one of which is described, the lower one being substantially similarly mounted) that include wheels 98 that ride above and below a pair of spaced support rods 100 that are mounted to vertical side brackets 102 that are attached to horizontal side brackets 104 that carry the slide brackets 84. The upper portion of the carriage mechanism 76 carries a stepping motor 105 and an encoder 106, also controlled by the computer 38 which has an output shaft and pulley 108 on which a timing belt 110 is carried, and the belt 110 is carried by another larger pulley 112 which is connected .to an elongated shaft 114 that extends to the lower portion. A lower pulley (not shown but similar to pulley 112) is connected to the shaft 114 and another timing belt is connected to a lower subcarriage mechanism. Thus, as the stepping motor operates, the timing belts attached to the subcarriage mechanisms move them laterally across the fabric for the purpose of positioning the camera, cutting mechanism and marking mechanism during operation.

To support the fabric while it is on the bed, a support surface 120, sometimes referred to as a rolling wrinkle, is provided and it is preferably a strong cloth that extends across the entire bed for the purpose of supporting the fabric 48. The surface 120 is preferably attached to a support bracket at both ends 122 and 124. In the area of the carriage the surface is directed downwardly so as to pass beneath the lower portion of the carriage mechanism, and this is done by the rolls 126, 128, 130 and 132. The rolls thereby permit the support surface to support most of the area of the fabric on the bed, but permits the carriage mechanism to be moved in the longitudinal direction of the apparatus as is desired. The support surface is sufficiently tensioned to maintain the fabric 48 relatively flat, thereby eliminating the need to maintain the fabric itself under extraordinary tension.

After the fabric has been scanned by the camera and the image digitized and processed by the computer, which will be hereinafter described, the fabric is cut and appropriately marked.

To cut the fabric, a mechanical cutter can be used, as can a laser cutter if desired. However, the preferred embodiment illustrated herein utilizes a water jet cutting mechanism 82, such as a Model No. 6X Single Waternife Intensifier, as manufactured by the Flow Systems, Inc. of Kent, Washington. This cutting mechanism directs a small stream of water at the fabric at an extremely high velocity that is sufficient to cut the fabric. The cutting mechanism is mounted to the upper portion of the transversely movable carriage mechanism and a water collector 134 is located immediately below the fabric to collect the water that is directed to the fabric for cutting it.

Additionally, when the fabric is advanced after cutting, the take-up roll should not apply tension to the web of cut fabric, for the reason that it can pull it apart, particularly when only a few threads are left uncut to maintain the integrity of the fabric. Therefore, in order to advance the cut fabric, a piston mechanism with a pad on the outer end is moveable to contact the fabric and press it against plates that are located adjacent the fabric beneath the cutter mechanism. When the fabric is to be advanced, the carriage is moved to the end of the frame near the supply roll and the pad pressed against the fabric. The carriage then is moved toward the take-up roll, pulling the fabric to advance it toward the take-up roll. This substantially eliminates any tension being applied to the portion of the web which has been cut, and the web can be wound onto the take-up roll without pulling the pieces apart.

The marking mechanism 80 is located beneath the fabric and is adapted to mark the underside of the fabric 48, which comprises a surface on most fabrics that is more easily read and is also on the side that is not visible on the finished item of furniture. The marking mechanism 80 is preferably an ink jet marker, such as a Model A-JU automatic spray gun manufactured by the Paasche Airbrush Co. of Harwood Heights, Ill. The jet is preferably placed sufficiently close to the fabric to easily mark it. The marking mechanism is controlled by the computer, which turns it on and off, and the computer controls the longitudinal and transverse movement of the carriage so as to move the marking head relative to the fabric and thereby mark the correct indicia on the fabric. It is preferred that the individual pieces be marked with some identification, so that the artisans that sew the pieces together to form the covering for the item of furniture will know how the pieces should be sewn together. Also, in the event the apparatus utilizes a cutting mechanism that leaves bridging portions along the cut lines, it is preferred that the marking mechanism mark cut lines on the bridging portions that are uncut, to thereby identify for the artisans exactly where the finishing cuts should be manually made in preparation for sewing.

The apparatus and method of the present invention is extremely powerful in terms of its capability to accurately and efficiently lay out pieces on a length of fabric, and to thereafter cut and mark the same. The power and effectiveness of the invention lies in its capability of minimizing waste, and in its automatic operation to place prominent design features in the proper locations of the finished product, whether it be a love seat, sofa, chair or other item of furniture. It also lies in its capability of compensating for dimensional distortion in the fabric, which it does by scanning the fabric, detecting dimensional distortion and thereafter altering the shape of the individual pieces of fabric that are to be cut and marked, to result in an undistorted appearance on the finished product.

These capabilities are carried out in an almost automatic manner by the apparatus. Material costs are reduced by reducing waste, and labor costs are reduced by virtue of the apparatus doing the tasks that had heretofore been done by the artisans. The apparatus of the present invention also eliminates, to a very large extent, the quality control problems that are associated with the laying out of pieces on a large expanse of fabric, and with compensating for dimensional distortion by either varying the shape of pieces or by attempting to straighten the fabric prior to lay out, both steps of which can be done with varying degrees of success by many artisans.

In terms of a brief overview of the operation of the present invention, the fabric 48 is unwound from the supply roll thereof and is taken across the bed 54 to the take-up roll. It is preferred that a leader of material be attached to the take-up roll mechanism, and that the leader be attached to the end of the fabric unwound from the supply roll. This enables the start of the actual fabric from the roll 46 being placed on the bed for scanning, cutting and marking without wasting any of it, and facilitates being wound onto the take-up roll. The leader is preferably sewn to the fabric 48 with a hand held sewing machine. The leader is preferably about 25 feet long and after the fabric has been used in the subsequent steps of fabricating an item of furniture, the leader can be removed and is available for subsequent use on another roll of fabric being processed. The leader obviates the necessity of threading the fabric through the apparatus, which would otherwise have to be done with the fabric were there no leader present.

When the fabric is on the bed, the camera 78 is turned on and the carriage is moved so that the fabric is scanned and the signal is sent to the computer 38, which digitizes and maps the design of the fabric into a memory means. It should be obvious that this operation would not be done for a solid fabric, but it is necessary for the majority of fabrics that are placed on upholstered pieces of furniture, which are either striped, and/or have a floral or other predominate design feature.

After the appropriate item of furniture is called up, the various pieces of the fabric that must be cut and marked are laid out on the terminal display screen associated with the computer. Of significant importance is the process by the computer of laying out the pieces so that predominant design features, such as a flower, are placed in the proper location, for example, to result in the flower being centered in a cushion of a sofa. By virtue of having mapped out the fabric and storing the same in the computer, and correlating this information with the stored mapped shapes of the fabric pieces that are needed, the computer can and does properly orient and place the individual pieces on the web of fabric. The computer thereafter controls the carriage mechanism to move the cutting mechanism through a path, selectively operating the cutting mechanism, to thereby cut the pieces of the fabric. The computer contains a library of files of various styles of pieces of furniture and particular fabrics, and thereby has a number of files, each of which contain a marker identifying the sizes and shapes of the pieces of fabric for a style of particular items of furniture, in addition to the location of the predominate design features of that fabric that must be cut from the web of fabric that will be subsequently sewn together to make the finished product. It should be understood that if the repeat pattern for the various fabrics is the same, i.e., the longitudinal and transverse spacing between predominate design features, such as flowers, is the same for two or more fabrics, then a single file may be used for all of those fabrics that may be used on a particular style of an item of furniture, even though the fabrics may otherwise have a different appearance. Thus, once a scanning and laying out of a particular fabric has been done for a particular style of an item of furniture, a file for that combination is preferably maintained, so that when an order for that combination is received, the fabric can be put on the apparatus, it can be scanned to determine what if any dimensional distortion exists, the shape of the pieces to be cut can be altered to compensate for the distortion, and the pieces can be cut.

Whether done before or after the cutting step, the computer also controls the carriage mechanism to move the marking mechanism, selectively operating the same, for marking the underside of the fabric. The apparatus continues to scan, mark and cut the web of fabric in successive lengths, i.e., hereinafter referred to as frames, that are moved onto the bed, and when all of the pieces for the desired number of pieces of furniture are cut and marked, the fabric that is wound onto the take-up roll can then be removed for transport to the sewing area.

It should also be understood that when a particular fabric has been scanned, digitized and written to memory of the computer, that information can become a part of the library, and subsequent lay out, cutting and marking of the same fabric can be done without the necessity of scanning the fabric for the purpose of digitizing and mapping the particular fabric design. However, as will be described, each successive frame of the web of fabric that is placed on the bed 48 is scanned for the purpose of detecting dimensional distortion of the fabric, so that compensating adjustments of the shape of the pieces of fabric can be made.

The apparatus is preferably sized so that each frame is approximately 60 inches long, but it should be understood that a greater or lesser size could be used. Additionally, it is necessary to scan the fabric so that the flowers, or other design features, can be properly located in the resulting pieces, as has been previously described.

Referring to FIG. 4a, the fabric is shown with a design feature 136, which is a simple design feature for purposes of illustration, and is shown in conjunction with two representative stripes 138. It should be understood that the design may be a complex and detailed flower or the like. The illustration of FIG. 4a is shown to be undistorted. However, as previously mentioned, the fabric may be distorted in various ways, such as that shown in FIG. 4b where the same design is skewed, and in FIG. 4c where the same design is bowed. In all of the illustrations of FIGS. 4a, 4b and 4c, the direction from the top to the bottom is in the longitudinal direction of the fabric.

In accordance with an important aspect of the present invention, the apparatus utilizes the camera to scan the fabric, producing signals which are sent to the computer, which then digitizes them and maps the image of the fabric and also records the information in an associated memory. It should be understood that the fabric should be undistorted when the mapping process takes place so that an accurate representation is obtained which is mapped and recorded into memory. However, the apparatus does not require a totally undistorted fabric for the purpose of determining a marker, the apparatus being capable of generating an accurate reference marker even though the fabric may exhibit some dimensional distortion, It is also well known to furniture manufacturers that virtually all fabrics that have flowers or some finite design feature have a repeat length or signature that occurs over a finite length. The signature may be up to two feet long, and occasionally it may be somewhat longer. The significance of the signature is that a flower; for example, that is present in the design will be present at the same location laterally along the longitudinal direction of the web of fabric, and this location is mapped and recorded into memory at a specific lateral coordinate, and the center of the flower will repeat along the longitudinal direction at a specific distance. As a result of the mapping and recording process, subsequent scanning of other frames of the fabric that are drawn onto the bed will enable the computer to detect and measure any deviation of the location of the actual flower being scanned from the location that the flower should be found.

After the fabric has been mapped and the digitized image recorded into memory, whether done at the time or from a previous operation, when a subsequent frame of fabric is drawn onto the bed, it can be scanned to determine if the fabric is distorted, i.e., whether it is skewed or bowed, and if so, the amount of skewing or bowing is determined and the shape of the pieces that are to be laid out, cut and marked can be adjusted to compensate for the dimensional distortion.

While many types of computers may be used as a part of the apparatus, the preferred computer is a Wyse PC386 having a 80386/16 microprocessor, a 40 megabyte hard disk drive and a 1 megabyte random access memory. It is preferred that the computer have a Mouse System Mouse 139, as manufactured by MSC Technologies. The computer 38 has associated equipment that is interconnected with other portions of the apparatus as is shown in FIG. 5. The computer is connected to an IBM AT type bus 138, to which an interfacing board 140 shown in FIG. 6 is connected, as are other boards, including a multi-function counter-timer and digital I/O expansion interface board 142, an interfacing of quadrature encoders board 144, a parallel adapter board 146, a graphics coprocessor board 148, a real-time imaging board 150, and a communication board 152 for the mouse.

With respect to the interfacing board 140, FIGS. 6a and 6b illustrate the circuits which control the operation of the stepper motors in the clockwise and counterclockwise directions. The FIG. 6a circuit is representative for operating a motor with an active or true high pulse, while the FIG. 6b circuit is representative for operating a motor with an active or true low pulse. The multi-function counter-timer and digital I/O expansion interface board 142 is a Model CTM-05 manufactured by the Metra Byte Corporation of Taunton, Mass. It provides five 16 bit counters, with divider and separate 8 bit I/O ports, which can be used for event counting for pulse output devices, period and pulse duration measurements and other time or frequency operations.

The interfacing of quadrature encoders board 144 is a Model AC36 encoder card manufactured by Altek Corporation. This card is connected to receive signals from the encoders 94 and 106 for the purpose of providing the computer system with signals that indicate the position of the carriage mechanisms 76 and 96. The apparatus also preferably has a fabric yardage wheel 154 that is adapted to measure the movement of the fabric across the apparatus when advancing the fabric. An encoder 156 is connected to the wheel and provides electrical signals to the encoder board 144 for eventual use by the computer 38. The parallel adapter board 146 is a Model AC5 parallel adapter card manufactured by the Opto 22 Company of Huntington Beach, Calif. It provides an interface between an IBM PC or compatible and standard I/O mounting racks of Opto 22 for controlling up to 24 bi-directional I/O lines. The mounting racks contain opto coupled relays for various types of load control, such as controlling the web, operating the cutting mechanism and the marking mechanism, as shown in FIG. 5.

The graphics coprocessor board 148 is a Model Pepper 1600 coprocessor board that includes an Intel 83786 Graphics Coprocessor and a Texas Instruments TMS34010 Graphics Processor and drives the display monitor 40. The real-time imaging board 150 is a Model MVP-AT manufactured by Matrox Electronic System Ltd. and it interfaces the output of the video camera 78 to the computer 38 and to the camera monitor 41. The communication board 152 essentially comprises an RS232 connector for connecting the mouse.

Figure 7:
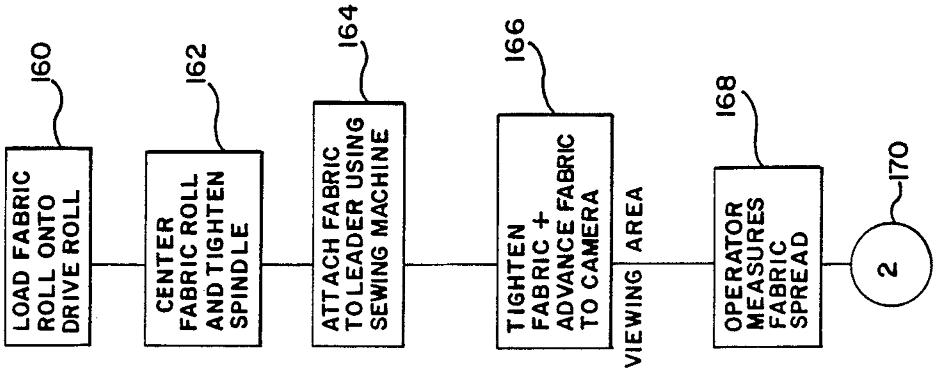

The manner in which the apparatus operates will also be described in connection with flow charts that comprise FIGS. 7 through 17, in which FIG. 7 illustrates the initial steps associated with loading the fabric on the apparatus, most of which are done manually. Block 160 indicates that the fabric should be loaded onto the supply roll mechanism 44, after which the fabric should be centered on the roll and the spindle associated with the supply roll mechanism (not shown, but which is conventional) is then tightened, as shown in block 162. The fabric should then be attached to the leader associated with the take-up roll mechanism by a hand-held sewing machine or the like as shown in block 164. The apparatus measures the initial spread between repeat lengths while the fabric is in an unstretched condition. The fabric is advanced to the camera viewing area as shown by block 166, then tightened by applying approximately 20 to 40 pounds of force and the spread is again measured to determine a stretch factor for the fabric (block 168). A node 170 identifies the start of the flow chart of FIG. 8 which illustrates the steps associated with the making of a marker, which is a layout of all pieces of fabric that are associated with a particular item of furniture.

Figure 8:
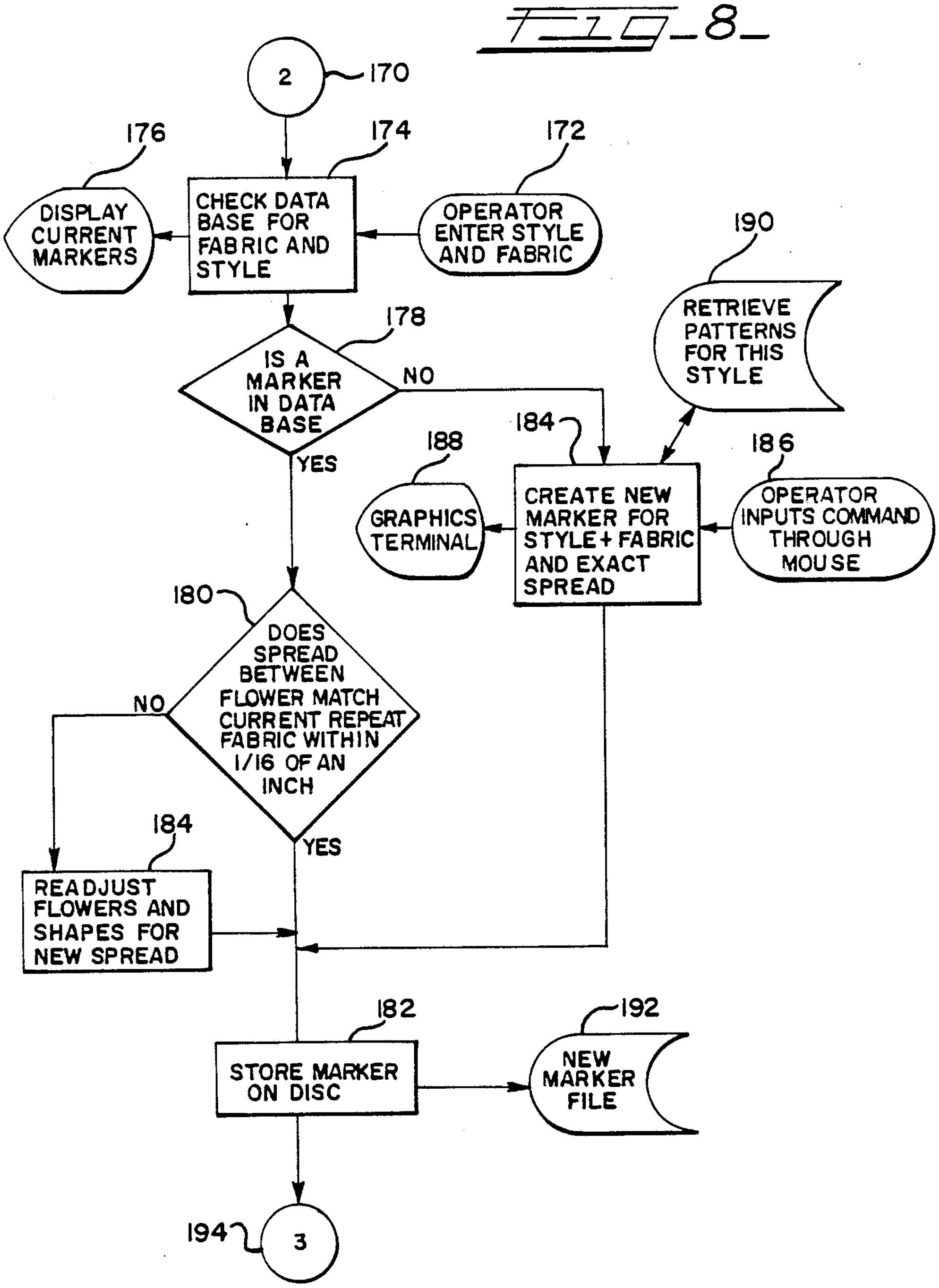
Figure 9:
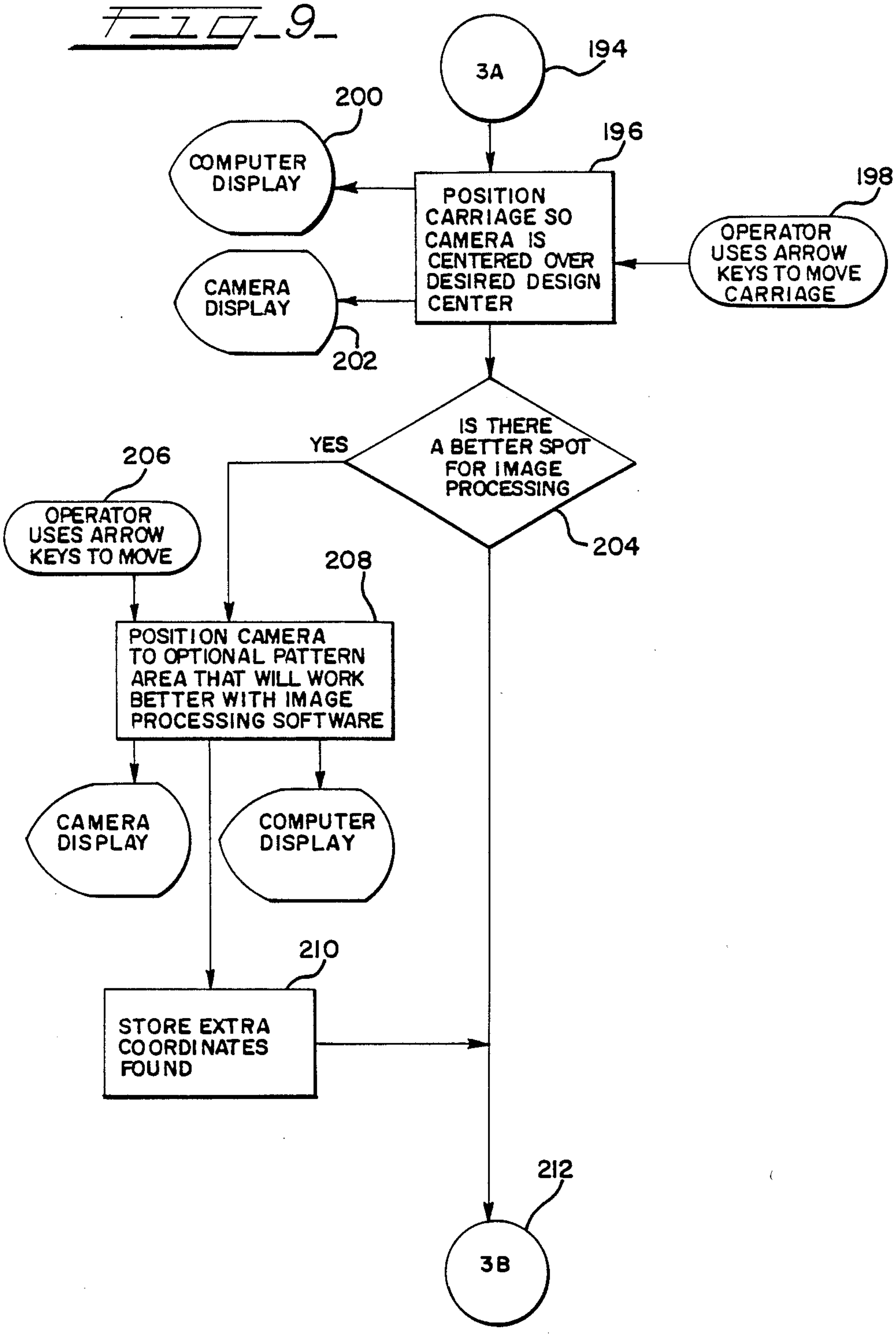

Referring to FIG. 8, the operator enters the furniture style, whether it is a love seat, sofa or the like and the fabric selection (block 172) and the apparatus checks its data base (block 174) to determine if this combination is present. If so, the marker is displayed as indicated by block 176. Also, the combination of the style and fabric decision is made by block 178, and if it is, the apparatus decides if the spread between the flowers matches the spread as measured by block 168 (block 180), and if it is within 1/16the of an inch, it stores the marker on disk (block 182). If the spread is out of the required tolerance, the apparatus readjusts the flowers and shapes for a new spread as shown by block 184.

If the marker is determined not to be in the data base, as determined by block 178, the apparatus creates a new marker for the particular style, fabric and spread (block 184), and this is done by the operator (block 186) manipulating the mouse, while viewing the display (block 188). In so doing, the operator retrieves patterns for this style from the data base (block 190), and the display illustrates "x"s identifying the centers of the flowers, and the sizes and shapes of the pieces of the fabric that are required for the style, and the pieces are laid out on the display, with small adjustments being made by the apparatus. When this is completed, which only takes a few minutes, then it is written into disk (block 182) and becomes a part of the library or data base for immediate as well as for future use (block 192). When this has been done, the process goes on to node 194, which continues the process in FIG. 9 where fabric scanning is initiating for the purpose of identifying the particular design element that will be used, such as a flower or the like.

To scan the fabric, the operator positions the carriage so that the camera is centered over the desired design center of a flower (block 196), using arrow keys on the keyboard (block 198), while viewing the display 41 (block 200) and the computer display 40 (block 202). It should be kept in mind that when making furniture, the original design usually determines where the center of the fabric pattern will appear on the selected pieces. For example, the back cushion usually has a bouquet of flowers centered. The designer also decides where this bouquet is on each type of fabric. Thus, the operator must position the camera directly over the chosen spot. This location is saved for purposes of aligning the pattern over the fabric. This spot may not be the best spot for imaging processing. The apparatus can retain the designated spot and allow for optional image processing spots. After this has been done, there is a decision as to whether an additional pattern can be obtained (block 204), which if decided yes, results in the operator again using the arrow keys (block 206) to reposition the camera to obtain a better pattern area for processing by the imaging processing software (block 208), utilizing the displays 40 and 41, as shown. If a better pattern is located, the coordinates for the pattern is written into memory (block 210). The flow chart proceeds to node 212, which is continued on FIG. 10.

Figure 10:
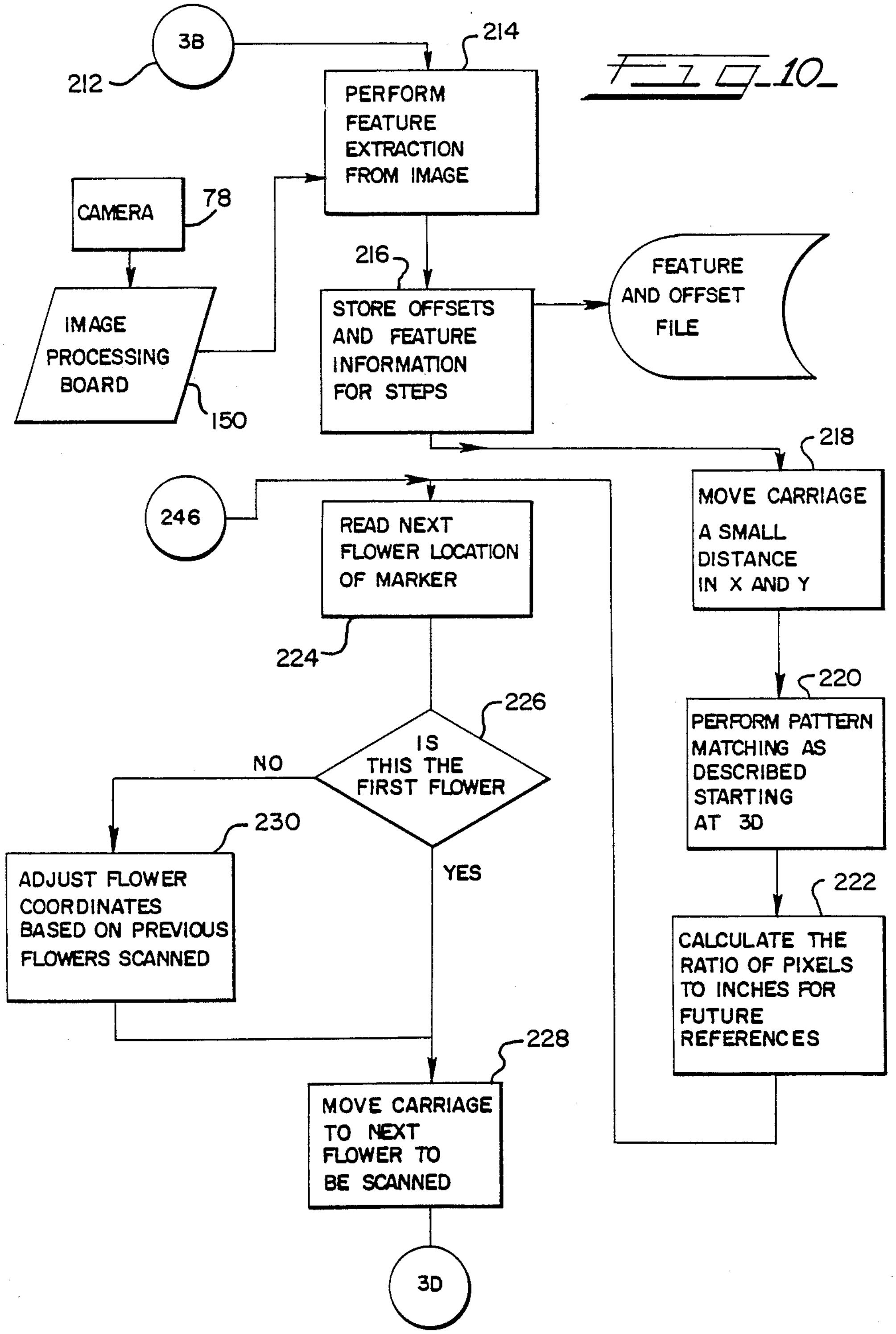

Referring to FIG. 10, the pattern that is being used undergoes a feature extraction operation (block 214) utilizing information from the camera 78 and the board 150, and the feature information and the coordinate offsets are stored in memory (block 216). The feature extraction involves performing a histogram of the image, deciding on what threshold intensity is best and then saving a square box section of the total image in a binary (i.e., black or white) format, the total intensity of the image is also saved. A smaller section enables the processing to be completed faster. After the information is stored, the carriage is moved a small distance in both the x and y coordinate directions (block 218) and pattern matching (block 220) is then performed in a manner to be discussed hereinafter. Then the ratio of pixels to inches is calculated for future reference, as shown in block 222. The next flower is then scanned in a similar process (block 224) and the decision as to whether that flower was the first flower is made (block 226). If it is the first flower, then the carriage is moved to the next flower to be scanned (block 228); if not then the flower coordinates are adjusted based on the previous flowers scanned (block 230), and the carriage is moved to the next flower to be scanned (block 228). These last steps (blocks 226, 228 and 230) are performed because of the tendency of a fabric to be slightly out of square, referred to as bow or skew, so that the flowers in the frame will not match the locations from the memory file exactly. The data from flowers scanned in previous frames can be used to very accurately project where the current flower of a current frame will be located. The system goes on to node 230 of FIG. 11.

Figure 11:
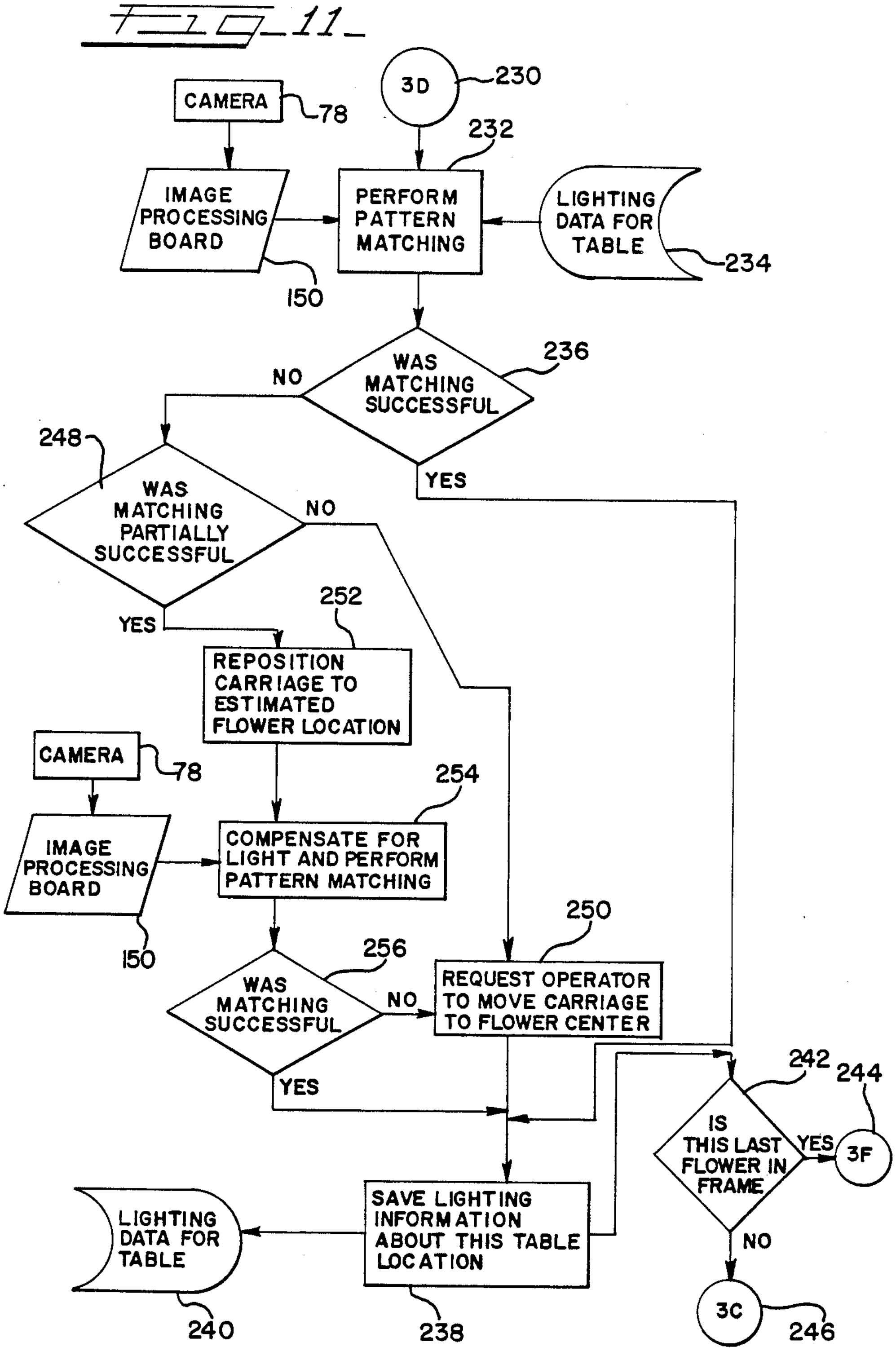

Referring to FIG. 11, the apparatus performs pattern matching (block 232 utilizing the output from the camera 78 and image processing board 150 together with lighting data from a table of light intensities that had been determined from a prior scanning of the field and which had been stored in memory for each coordinate of the table or field (block 234). As previously mentioned, the lighting values for each increment of the field or table is very important. While it is desirable to place the apparatus in a room having completely controlled lighting, it is not always possible in an industrial setting. The present invention maintains a data base about the light values in different locations of the field for different fabrics. Every time a pattern match is made successfully or unsuccessfully, this data base is updated. Thus, with every match the system accumulates more and more knowledge about the light values of the table. In this manner, simple overhead lighting may be successfully used with the system. After pattern matching is attempted, a decision as to whether it was successful is made (block 236). If it was successful, then the lighting value information is updated (block 238) to a data base table (block 240) and the decision is made as to whether this was the last flower in the frame (block 242), which if it were, results in the process going to node 244. If not the last flower in the frame, the process proceed to node 246 which returns to block 224 in FIG. 10.

If pattern matching was unsuccessful in block 236, the determination whether it was partially successful is made in block 248. If not, the operator is requested to move the carriage to the center of the flower manually, using the keyboard arrows (block 250), whereupon the lighting information is again updated (block 238). If it were partially successful, the carriage is repositioned to estimate of the flower location (block 252) and a compensating calculation is made for light variation and pattern matching is again attempted (block 254), using the output of the camera 78 and image processing board 150. After this step is accomplished, pattern matching is again attempted (block 256), which if successful, results in the lighting information being saved (block 238), or if not, requests the operator to move the carriage to the center of the flower (block 250).

Figure 12:
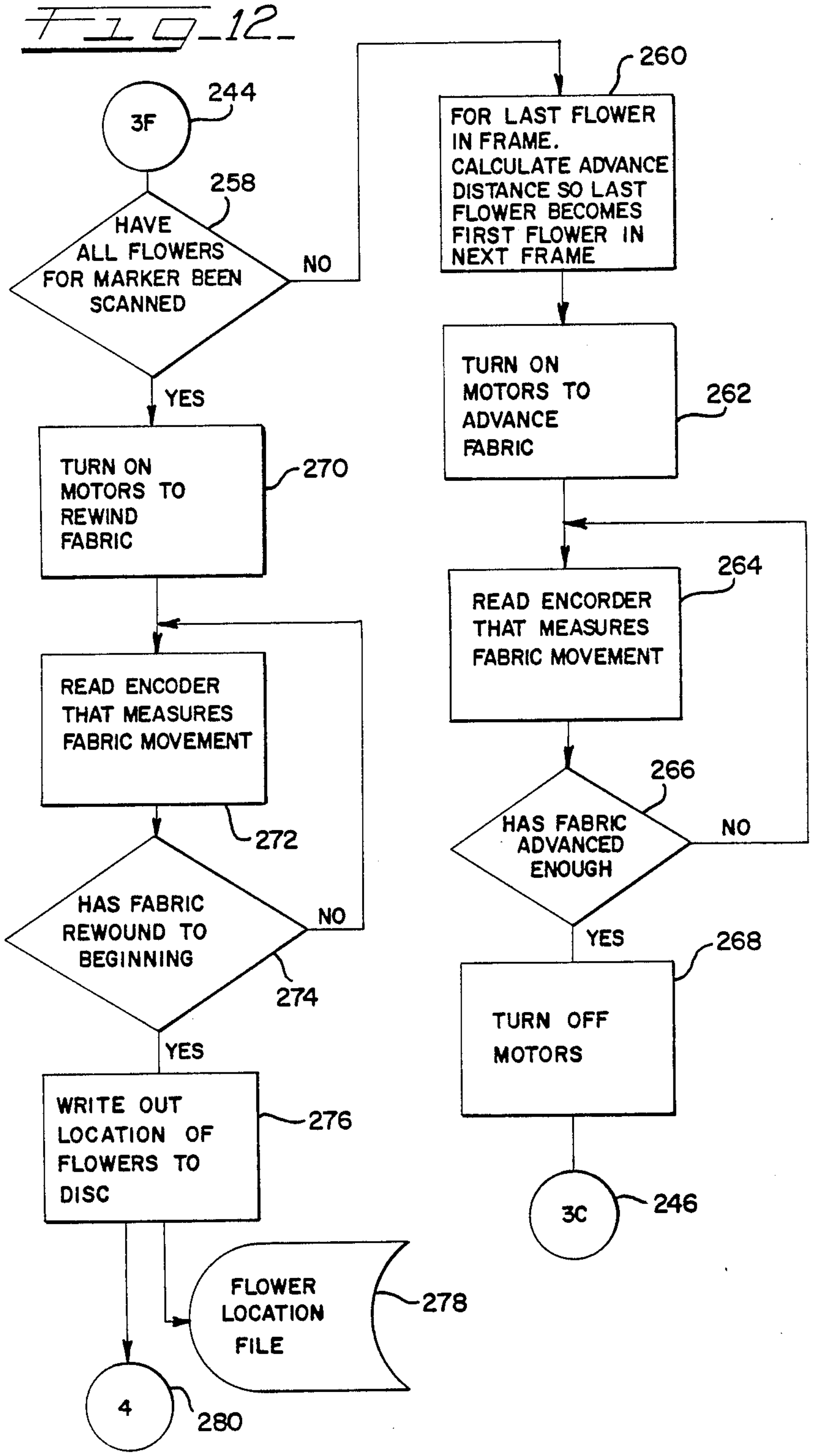

Once all of the flowers have been scanned and their locations determined for a given frame, the apparatus advances the fabric to repeat the process with respect to the all frames of the fabric that are required for a given marker. After that has been accomplished, the fabric is rewound and the apparatus makes another pass at the fabric which comprises the full marker for the purpose of cutting and marking the fabric. Turning to FIG. 12, the first step is to determine whether all flowers for the marker have been scanned (block 258). If not, then it is necessary to find the last flower in the frame, and to calculate the advance distance so that the last flower becomes the first flower in the next frame (block 260). When the fabric has been advanced, the first flower scanned in a new frame should always be the last flower at the end of the previous frame. In this way, the actual distance between flowers is exactly determined. During the advance of the fabric from one frame to the next, the fabric movement is measured by the wheel 154 and encoder 156.

It should be appreciated that because of variation of nap and other different characteristics of different fabrics, there can be a slight error from the reading from the wheel and encoder. The motors are then turned on to advance the fabric (block 262) and the encoder 156 is read (block 264). The determination is then made as to whether the fabric has advanced enough (block 266). If not, the motors continue to run and the encoder is again read (block 264). If the fabric has advanced enough, the motors are turned off (block 268) and the process returns to node 246 of FIG. 10.

If all flowers for the marker have been scanned (block 258), then the motors are turned on to rewind the fabric (block 270) and the encoder that measures fabric movement is read (block 272). The determination whether the fabric has been rewound to the beginning is made (block 274) which if it has, results in the location of the flowers being written to disk (block 276) which is stored in a file (block 278) and the system proceeds to node 280. If the fabric has not been rewound to the beginning, the motor continues and the encoder is read (block 272) until the determination reveals that it has been rewound to the beginning.

Figure 13:
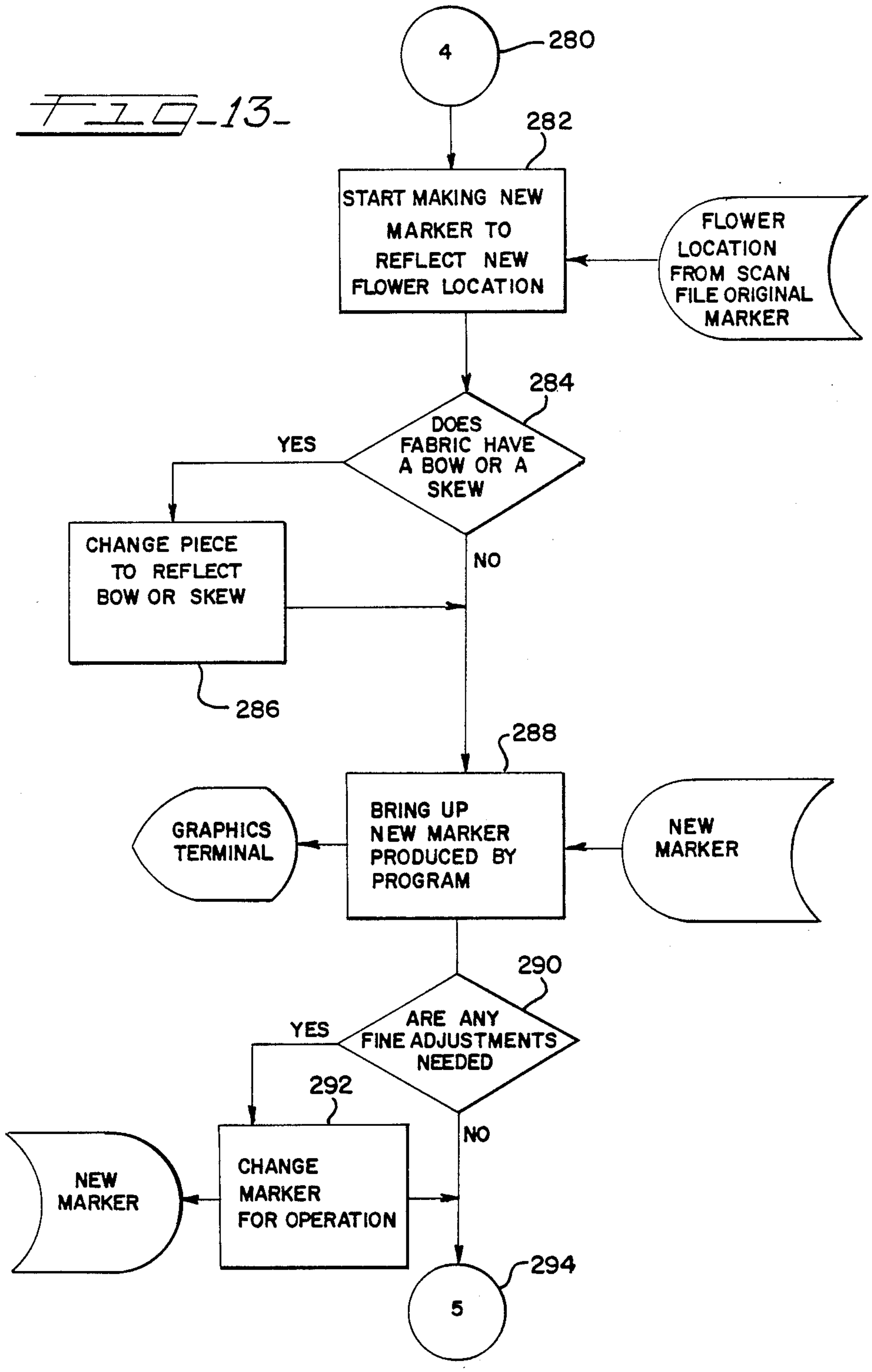

The previous operations have generated a marker for a style and fabric and have also determined the actual locations of the flowers on the fabric. The next step for the apparatus is to provide compensation of the marker to accommodate any dimensional distortion that has been revealed from the scanning of the fabric. Turning to FIG. 13, the next step is to make a new marker to reflect new flower locations (block 282), using flower location information from the scan file and the original marker. It should be kept in mind that when furniture is made, certain pieces must be matched perfectly, while other do not have to be so perfectly matched. For example, the seat cushions must have the flowers in the same locations as the original furniture designer designated. The fabric that attaches to the cushion zippers does not have to match. The apparatus will move all shapes that have to matched based on the flowers scanned. The new marked will be able to display all of the flowers that are actually on the fabric. The matched pieces will have been moved onto those flowers. The unmatched pieces will have been butted against the matched pieces, leaving no gaps of wasted material.

After the new marker is made, a determination as to whether the fabric exhibits a bow or skew is made (block 284), which if such is exhibited, results in the apparatus changing the shape of the pieces to compensate for the bow or skew (block 286), which results in a new marker being made .(block 288). If no bow or skew is detected, the marker is not changed. After the new marker is produced by the program (block 288), it is determined whether any fine adjustments are needed (block 290). If so, then the marker is changed (block 292); if not, the process goes to node 294.

Figure 14:
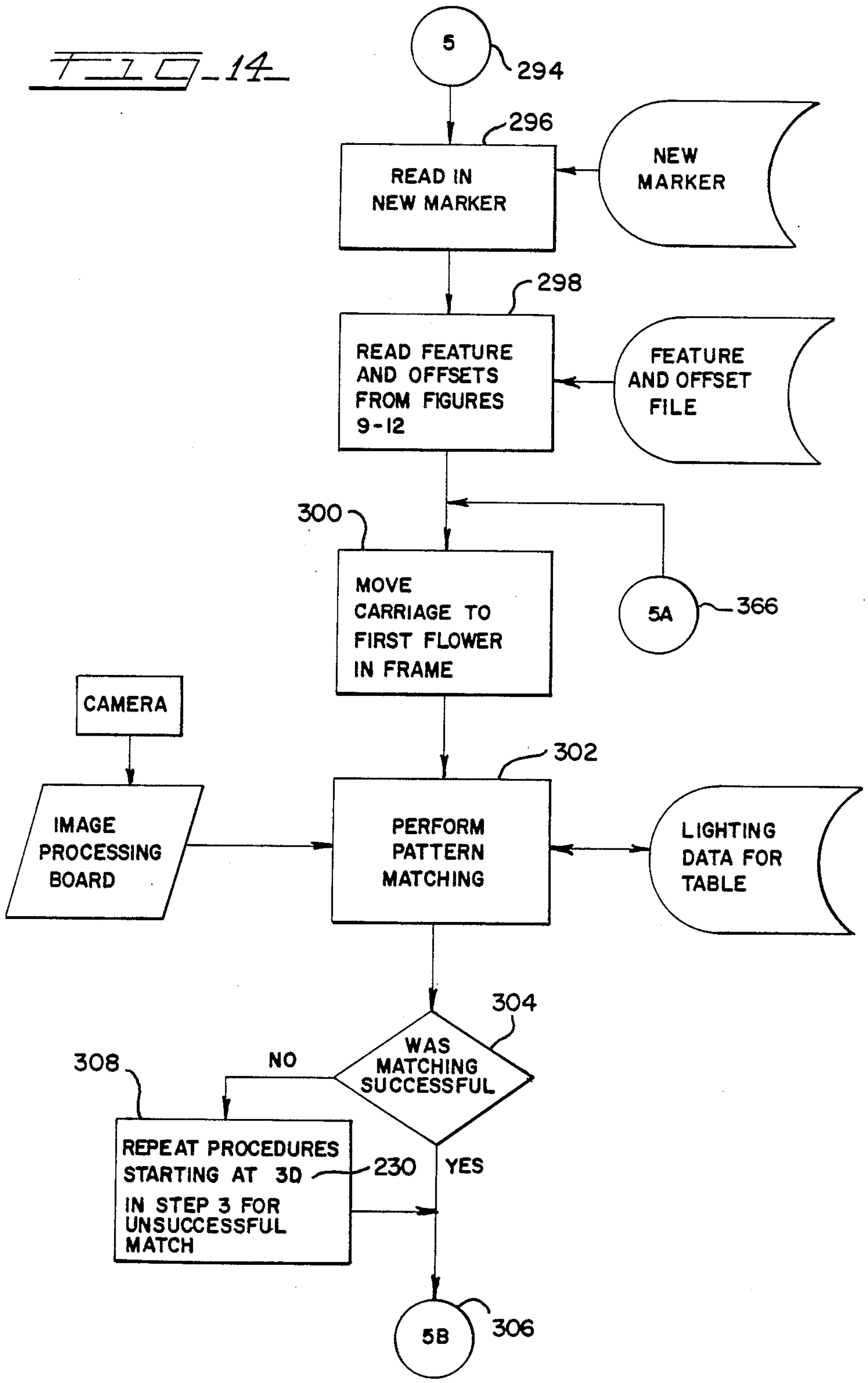
Figure 15:
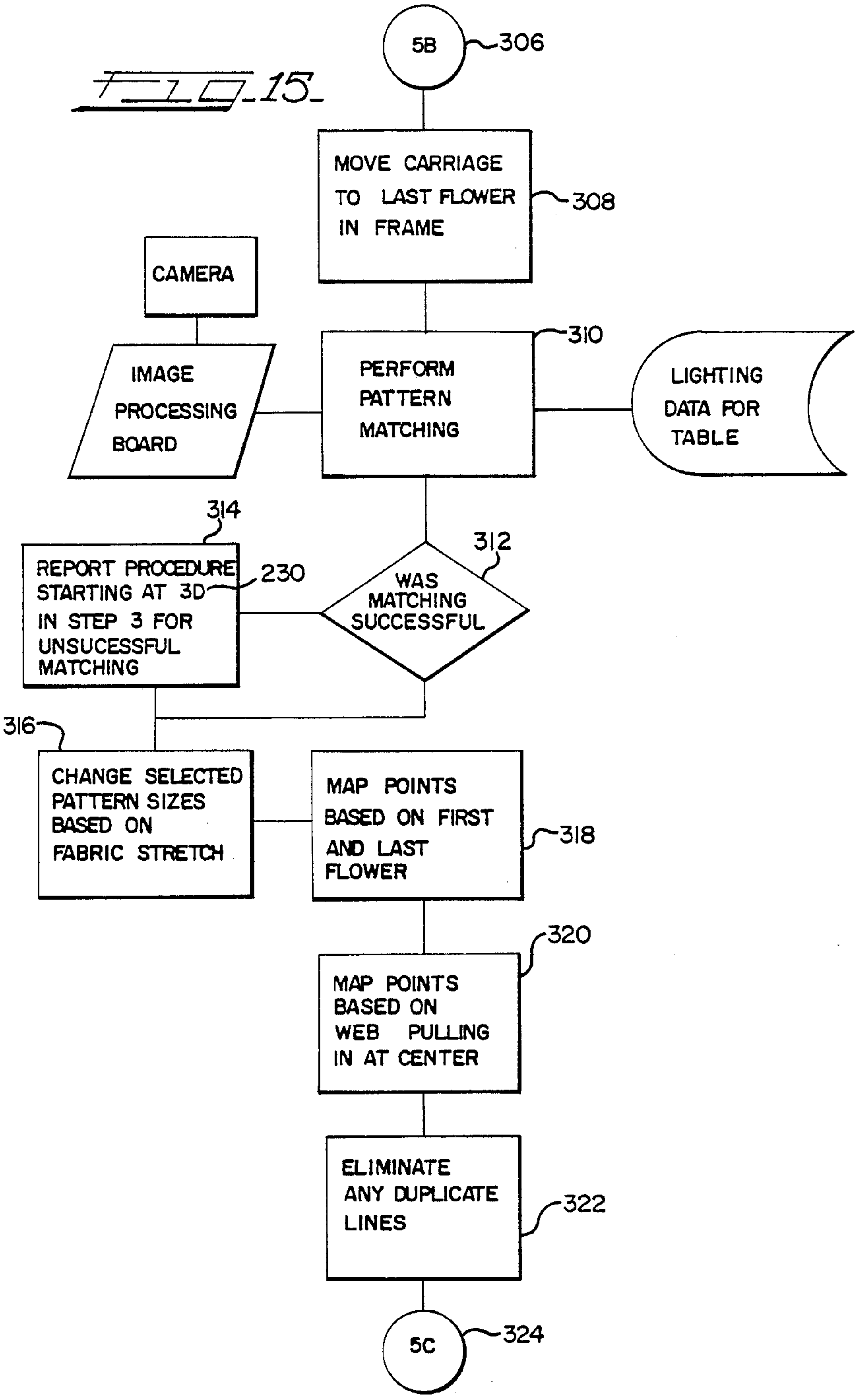

At this stage of the operation of the apparatus, the marker has been determined and has been compensated for any dimensional distortion that has been detected. It is then necessary to perform the cutting and marking operation, which is accomplished by the apparatus in accordance with the steps illustrated in FIGS, 14 through 17. Turning to FIG. 14, the apparatus reads in the new marker (block 296) and then reads the feature and offsets as determined from the operations described in FIGS. 9 through 12 (block 298). The carriage is then moved to the first flower in the frame (block 300) and pattern matching is attempted (block 302) using lighting data and the output from the camera and image processing board. A determination whether the pattern matching was successful is made (block 304), and if so, the process proceeds to node 306. If matching was unsuccessful, the steps are repeated beginning at node 230 of FIG. 11 (block 308). After a successful match has been accomplished, the process goes to node 306 of FIG. 15.

The carriage is next moved to the last flower in the frame (block 308) and pattern matching is attempted (block 310). A determination whether the matching is successful is then made (block 312), and it is successful, then the apparatus changes selected pattern sizes based on fabric stretch that had been determined (block 316), and points are mapped based on the first and last flower locations (block 318). This mapping routine will allow for the fabric being stretched slightly and for the fabric not being fed through the web system perfectly straight. If the matching is unsuccessful, then the steps are repeated beginning at node 230 (block 314).

Points are also mapped based on the characteristic that the center portion between the supported ends of a frame of fabric will be narrower (block 320). Also, any duplicate lines are omitted (block 322). This is generally required and is a result of two pieces being adjoining. Since only one cut is required to separate them, the apparatus notes such condition and makes only one pass to cut the pieces. It is also necessary to make only one pass along a common line, because a double pass using the preferred water jet cutting means results in the complete severing of all fibers or threads along the cut line, and the pieces would then fall apart. The apparatus proceeds to node 324 in FIG. 16.

Figure 16:
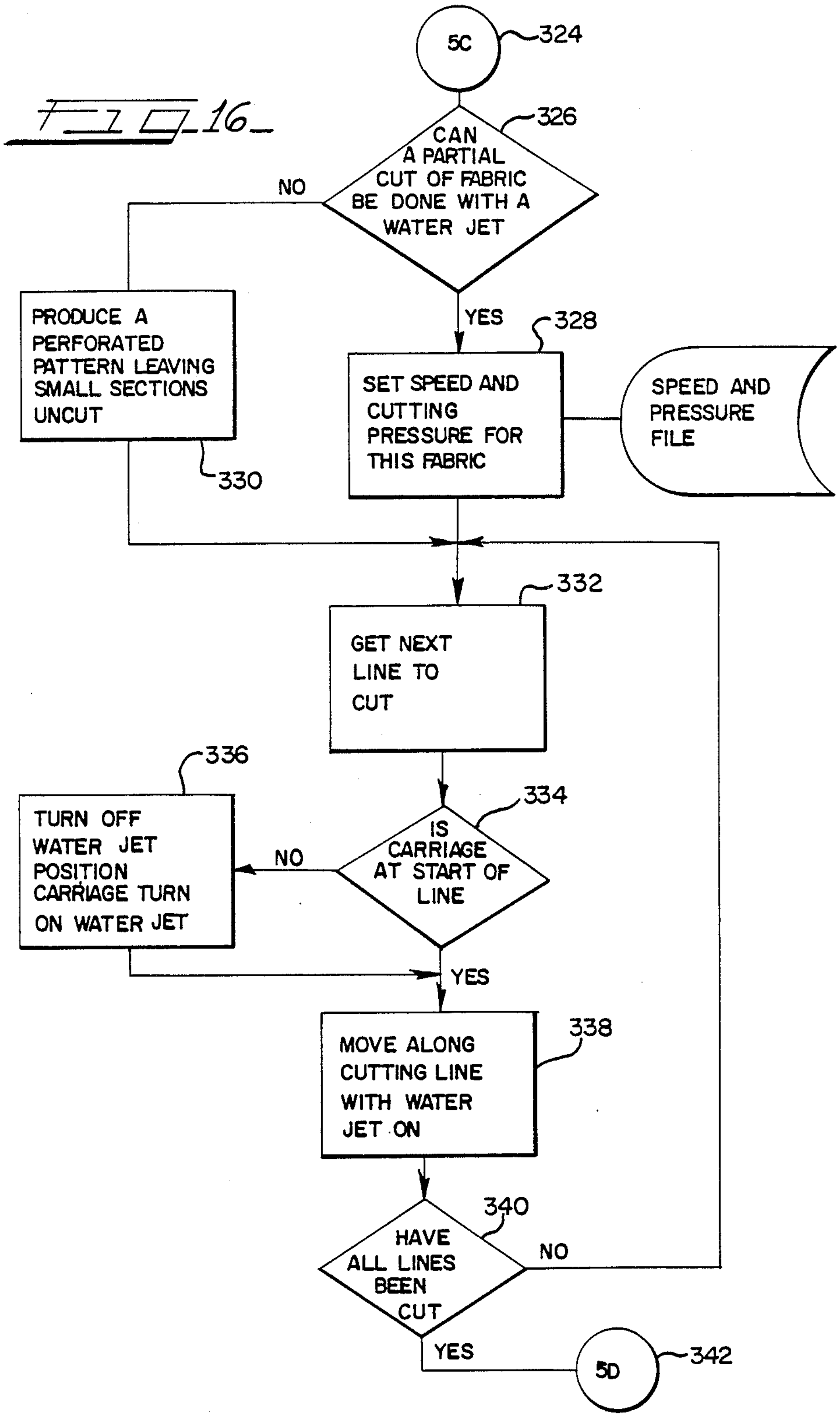
Figure 17:
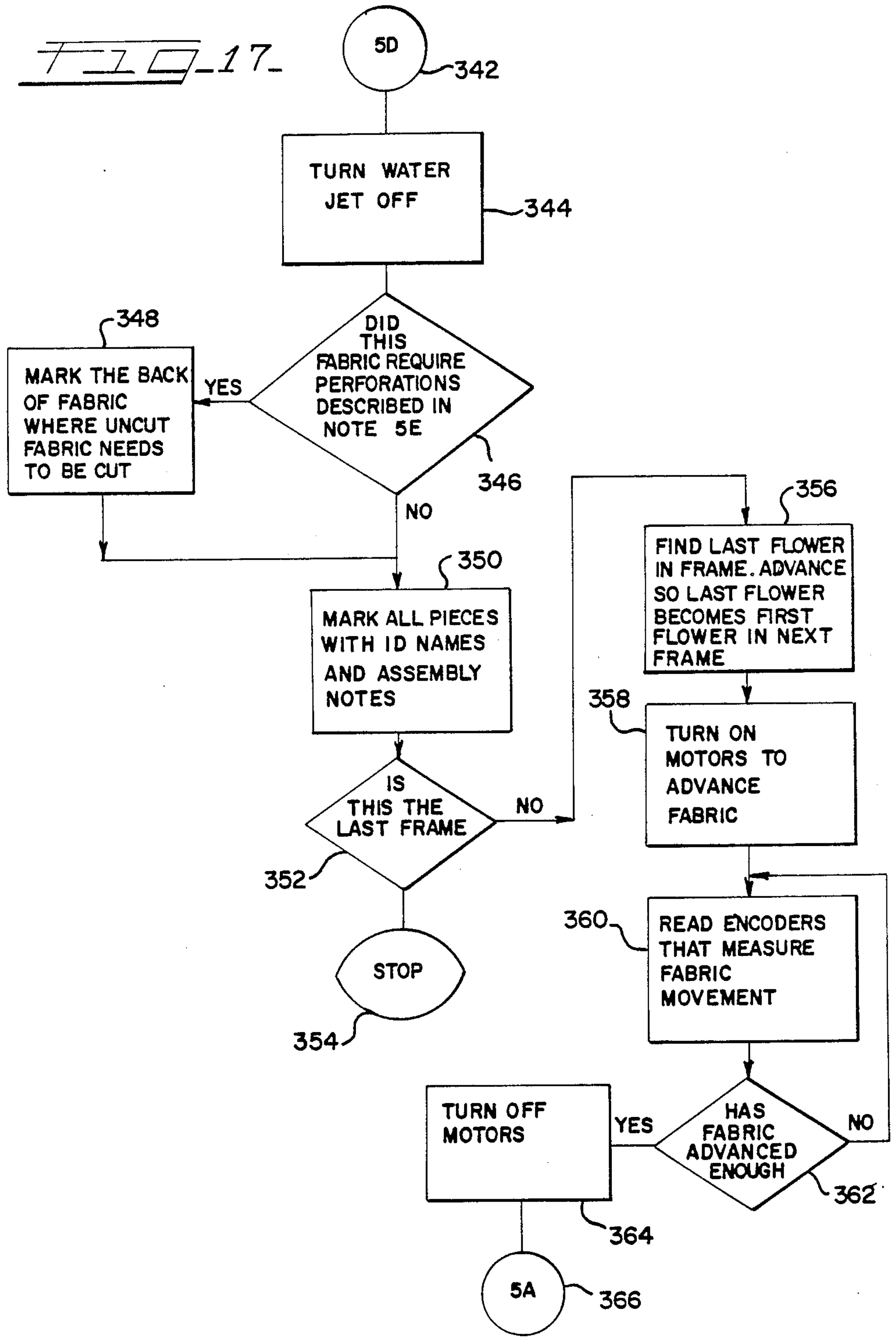

The apparatus is ready to perform the cutting and marking operations, and referring to FIG. 16, a determination as to whether a partial cut of fabric can be done with a water jet cutting mechanism (block 326). If it can, then the speed and cutting pressure for this fabric is set, using information from a speed and pressure file (block 328). If it cannot, then the apparatus produces a perforated pattern leaving small web or bridging sections uncut (block 330). Once these determinations have been made, the apparatus finds a line to cut (block 332), and determines if the carriage is at the start of a line (block 334). If it is not at the start of a line, the water jet is turned off, the carriage positioned, and the water jet is then turned on (block 336). The carriage is then moved along a cut line with the water jet on (block 338) and the determination is made as to whether all lines have been cut (block 340). If not, the apparatus is returned to block 332, if so, the apparatus proceeds to node 342 of FIG. 17.

When all cuts have been made, the water jet is turned off (block 344), and the determination is made as to whether the fabric required perforations (block 346). If there were perforations, the back of the fabric is marked where uncut fabric needs to be cut (block 348). If perforations were not required, the apparatus then marks all pieces with identification names and assembly notes (block 350). The determination is then made whether this is the last frame (block 352). If so, the apparatus is stopped (block 354); if not, then the last flower in the frame is found, and the fabric is advanced so that the last flower becomes the first flower in the next frame (block 356). The motors are then turned on to advance the fabric (block 358), and the encoders are read which measure the fabric movement (block 360). The determination as to whether the fabric has advanced enough is made (block 362). If it has not, the motors continue to operate; when it has the motors are turned off (block 364), and the apparatus proceeds to block 366 of FIG. 14.

It has been found that the water jet cutting mechanism operates more efficiently when cutting pieces of fabric near the edge of the fabric, if it cuts toward the edge, rather than from the edge toward the center. Accordingly, when such cuts are called for, the apparatus moves the carriage so that the cut is started on the interior of the fabric and cuts toward the edge.

From the foregoing, it should be appreciated that a novel method and apparatus has been shown and described which enables high quality upholstered furniture to be made in a consistent and efficient manner. The method and apparatus described fulfills all of the objects and advantages that have been previously described.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for use in cutting and marking a web of fabric for use in making an item of upholstered furniture or the like, said fabric having at least one distinct visible design feature and a predetermined repeat length, comprising:

means for holding a length of said fabric between two stations on a work area such that the length is in a generally planar orientation;

means for scanning said fabric to identify at least one predominate visible design feature of at least two repeat lengths and storing the locations of each identified design feature in a memory means;

means for comparing the locations of stored design features of one or more adjacent stored design features to determine the presence and absence of dimensional distortion of the web;

means for determining a layout on the web of fabric, the layout comprising a number of pieces of fabric of predetermined shapes and sizes that are to comprise the pieces of fabric for the item of furniture to be made;

means for selectively adjusting the predetermined shapes and sizes of predetermined ones of the pieces of fabric to compensate for the presence of dimensional distortion of the web so that the resulting item of furniture to be made will have no visible fabric distortion and the fabric will snugly cover and fit on the item of furniture;

means for selectively cutting said web of fabric into pieces of said predetermined shapes and sizes, said cutting means being moveable about said work area; and, means for selectively marking said fabric to identify future cut lines and to identify pieces of fabric, said marking means being moveable about said work area.

2. Apparatus as defined in claim 1 wherein said adjusting means adjusts for dimensional distortion of skew of the fabric, wherein the orientation of the fabric is in a generally straight line that is angled relative to the longitudinal direction of undistorted fabric.

3. Apparatus as defined in claim 2 wherein the apparatus determines the dimensional distortion of skew by comparing the coordinate locations of common design features of adjacent repeat lengths.

4. Apparatus as defined in claim 1 wherein said adjusting means adjusts for dimensional distortion of bow of the fabric, wherein the orientation of the fabric is in a generally curved line relative to the longitudinal direction of undistorted fabric.

5. Apparatus as defined in claim 4 wherein the apparatus determines the dimensional distortion of bow by comparing the coordinate locations of common design features of adjacent repeat lengths.

6. Apparatus as defined in claim 1 wherein said adjusting means adjusts for dimensional distortion of stretching of the fabric, wherein the fabric located over the work area between said two stations is narrower in the center portion between the stations than at the end portions of the work area near the stations, and for the amount of elongation that is exhibited in the fabric in response to a predetermined amount of stretching force applied to the fabric.

7. Apparatus as defined in claim 1 wherein said holding means includes a flexible web of material located beneath said fabric in said work area, said web being attached to opposite ends of the work area adjacent said stations, said holding means including means for deflecting the web below said cutting means and said marking means when said cutting means and marking means moves about the work area.

8. A method of cutting and marking a web of fabric for use in making an item of upholstered furniture or the like, said fabric having at least one distinct visible design feature and a predetermined repeat length, comprising:

holding a length of said fabric between two stations such that the length is in a generally planar orientation;

scanning said fabric to identify at least one predominate visible design feature of at least two repeat lengths and storing the locations of each identified design feature in a memory means;

comparing the locations of stored design features of one or more adjacent stored design features to determine the presence and absence of dimensional distortion of the web;

determining a layout on the web of fabric, the layout comprising a number of pieces of fabric of predetermined shapes and sizes that are to comprise the pieces of fabric for the item of furniture to be made;

selectively adjusting the predetermined shapes and sizes of predetermined ones of the pieces of fabric to compensate for the presence of dimensional distortion of the web so that the resulting item of furniture to be made will have no visible fabric distortion and the fabric will snugly cover and fit on the item of furniture.

9. A method as defined in claim 8 wherein said adjusting step adjusts for dimensional distortion of skew of the fabric, wherein the orientation of the fabric is in a generally straight line that is angled relative to the longitudinal direction of undistorted fabric.

10. A method as defined in claim 9 wherein said adjusting step determines the dimensional distortion of skew by comparing the coordinate locations of common design features of adjacent repeat lengths 11. A method as defined in claim 8 wherein said adjusting step adjusts for dimensional distortion of bow of the fabric, wherein the orientation of the fabric is in a generally curved line relative to the longitudinal direction of undistorted fabric.

12. A method as defined in claim 11 wherein said adjusting step determines the dimensional distortion of bow by comparing the coordinate locations of common design features of adjacent repeat lengths 13. A method as defined in claim 8 wherein said adjusting step adjusts for dimensional distortion of stretching of the fabric, wherein the fabric located over the work area between said two stations is narrower in the center portion between the stations than at the end portions of the work area near the stations, and for the amount of elongation that is exhibited in the fabric in response to a predetermined amount of stretching force applied to the fabric.

14. Apparatus for use in cutting and marking a web of fabric for use in making an item of upholstered furniture or the like, said fabric having at least one distinct visible design feature and a predetermined repeat length, comprising:

a frame structure having supply roll means and take-up roll means located on opposite end portions thereof, the apparatus being adapted to unroll the web of fabric from the supply roll means onto the take-up roll means during operation, said frame structure having a bed between the supply roll means and the take-up roll means over which the web of fabric is drawn;

carriage means attached to said frame structure adjacent the bed and carrying a camera means, a marking means and a cutting means, said carriage means being moveable relative to the bed to move said camera means, marking means and cutting means in both the transverse and longitudinal directions along the bed;

control means operatively connected to said apparatus for selectively controlling each of said carriage means, camera means, marking means, and cutting means, said control means including a computing means, a monitor means, a keyboard means and at least one memory means;

said control means controlling said carriage means and said camera means to move the carriage means about the bed so that the camera can scan said fabric to identify at least one predominate visible design feature of at least two repeat lengths and storing the coordinate locations of each identified design feature in said memory means;

said control means being adapted to compare the coordinate locations of stored design features of one or more similar stored design features on the web of fabric on the bed to determine the presence and absence of dimensional distortion of the web;

said control means being adapted to determine a layout of a number of pieces of fabric of predetermined shapes and sizes on the web of fabric, the layout comprising a portion of the pieces of fabric that are required for the item of furniture to be made, said control means being adapted to selectively adjust the size and shape of the predetermined shapes and sizes of predetermined ones of the pieces of fabric to compensate for the presence of dimensional distortion of the web so that the resulting item of furniture to be made will have no visible fabric distortion and the fabric will snugly cover and fit on the item of furniture;

said control means selectively controlling said carriage means to move said cutting and marking means about said bed to cut and mark the web fabric into pieces having said adjusted sizes and shapes, said cutting be done such that the web of fabric maintains its structural integrity so that it can be rolled onto the take-up roll means.

15. Apparatus as defined in claim 14 wherein said bed includes a flexible web of material located beneath said fabric in said work area, said web being attached to opposite ends thereof adjacent said supply roll means and said take-up roll means, said carriage means including means for deflecting the web of material below said cutting means and said marking means when said cutting means and marking means moves about the work area.

16. Apparatus as defined in claim 14 wherein said control means controls said cutting means such that cutting of the fabric for cutting pieces that require cutting of the edge of the web commences interiorly of the web and is completed at the edge of the web.

17. Apparatus as defined in claim 14 wherein said carriage means includes a lower support means mounted thereto below the web of fabric and a moveable arm means adapted to be controlled by said control means and be moved into contact with the web of fabric and impinge the fabric against the lower support means whereby movement of the carriage means draws the fabric toward the take-up roll means.

18. Apparatus as defined in claim 14 wherein said cutting means comprises a liquid jet cutting mechanism that directs a narrow stream of liquid to the web of fabric at such a velocity created by a predetermined high pressure that all but a small proportion of threads are severed.

19. Apparatus as defined in claim 14 wherein said cutting means comprises a laser cutting mechanism that cuts all but a small proportion of threads.

20. A method of scanning a web of material using a video camera which produces an electrical signal that is indicative of the image that is viewed by the camera and a computing means which records digital data indicative of the image in a memory means, the web of material being located on a generally planar work area, the method comprising:

scanning substantially the entire work area with the work area having a web of material of a substantially constant light value through the work area;

measuring the light value of each of a large plurality of coordinate locations throughout the web of material on the work area;

recording in said memory means the measured light values and the coordinate locations at which the measured light values were taken for the plurality of locations to thereby generate a data base of light values at a plurality of locations of the work area;

scanning webs of material that are subsequently located on the work area with the camera and producing an electrical signal indicative of the image of the scanned webs;

compensating the electrical signal of the image obtained by the camera by a light value factor for the coordinate location that the camera viewed the web and generating data indicative of the image; and recording data indicative of the image of webs of material in the memory means, said data having been compensated by a light value factor for the coordinate location that the camera the web.

21. The method as defined in claim 20 including the step of updating said data base of light values for any coordinate location when the computing means successfully identifies data indicative of a design feature of the web of material viewed by the camera with stored data of that d .feature.

22. The method as defined in claim 20 wherein said plurality of coordinate locations include locations within a predetermined distance from one another across substantially the entire surface of the work area.

23. The method as defined in claim 22 wherein said predetermined distance is approximately one inch.

24. A method of scanning a web of fabric using a video camera which produces an electrical signal that is indicative of the image that is viewed by the camera and a computing means which records digital data indicative of the image in a memory means, the web of fabric being located on a generally planar work area, the method comprising:

scanning substantially the entire work area with the work area having a web of fabric of a substantially constant light value through the work area;

measuring the light value of each of a large plurality of coordinate locations throughout the web of fabric on the work area;

recording in said memory means the measured light values and the coordinate locations at which the measured light values were taken for the plurality of locations to thereby generate a data base of light values at a plurality of locations of the work area;

scanning webs of fabric that are subsequently located on the work area with the camera and producing an electrical signal indicative of the image of the scanned webs;

compensating the electrical signal of the image obtained by the camera by a light value factor for the coordinate location that the camera viewed the web and generating data indicative of the image; and, recording data indicative of the image of webs of fabric in the memory means, said data having been compensated by a light value factor for the coordinate location that the camera viewed the web.

* * * * *